(12) United States Patent
Ohtake et al.

(10) Patent No.: US 9,444,352 B2
(45) Date of Patent: Sep. 13, 2016

(54) CURRENT RESONANCE TYPE POWER SUPPLY DEVICE

(71) Applicant: Sanken Electric Co., Ltd., Niiza-shi, Saitama (JP)

(72) Inventors: Osamu Ohtake, Niiza (JP); Ryuichi Furukoshi, Asaka (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 0 days.

(21) Appl. No.: 14/658,274

(22) Filed: Mar. 16, 2015

(65) Prior Publication Data
US 2015/0280577 A1    Oct. 1, 2015

(30) Foreign Application Priority Data

Mar. 26, 2014 (JP) ................. 2014-063984

(51) Int. Cl.
  *H02M 3/335* (2006.01)
  *H02M 1/08* (2006.01)
  *H02M 7/537* (2006.01)
  *H02M 1/00* (2006.01)

(52) U.S. Cl.
  CPC ........... *H02M 3/33507* (2013.01); *H02M 1/08* (2013.01); *H02M 3/33523* (2013.01); *H02M 3/33553* (2013.01); *H02M 2001/0025* (2013.01); *H02M 2001/0032* (2013.01); *Y02B 70/16* (2013.01)

(58) Field of Classification Search
  CPC ........... H02M 3/335; H02M 3/33507; H02M 2007/4815; H02M 3/33546; H02M 2001/0032; H02M 7/537; H02M 7/5387

USPC ........... 363/21.02, 21.03, 21.09, 21.1, 21.11, 363/21.17, 21.18, 97

See application file for complete search history.

(56) References Cited

U.S. PATENT DOCUMENTS 8,213,189 B2    7/2012 Nishikawa
2005/0157522 A1    7/2005 Osaka (Continued)

FOREIGN PATENT DOCUMENTS

JP    H07-135769 A    5/1995
JP    2006-204044 A    8/2006

(Continued)

OTHER PUBLICATIONS

Japanese office action letter issued on Feb. 23, 2016 in the counterpart Japanese patent application.

*Primary Examiner* — Gary L Laxton
(74) *Attorney, Agent, or Firm* — Mots Law, PLLC

(57) ABSTRACT

Embodiments of the invention may include: a series circuit connected to a junction of a first switch element and a second switch element connected in series across ends of a DC power supply, and to one end of the DC power supply, and formed of a primary winding of a transformer and a capacitor; a rectifier/smoothing circuit configured to rectify and smooth a voltage generated in a secondary winding of the transformer thereby to extract a DC voltage; a control circuit configured to alternately turn on and off the first switch element and the second switch element; a voltage detector configured to detect a voltage of the DC power supply; and a duty controller configured to, under a light-load condition, set a duty ratio between the first switch element and the second switch element closer to 50% as a value of the voltage detected by the voltage detector becomes larger.

5 Claims, 17 Drawing Sheets

(56) References Cited

U.S. PATENT DOCUMENTS

| | | | | |
|---|---|---|---|---|
| 2010/0202162 A1* | 8/2010 | Yang | ............... | H02M 3/33523 363/21.02 |
| 2011/0261592 A1* | 10/2011 | Samejima | ............... | H02M 1/32 363/21.02 |
| 2015/0194896 A1* | 7/2015 | Stuler | ............... | H02M 3/33523 363/21.02 |
| 2015/0214844 A1* | 7/2015 | Kyono | ............... | H02M 3/33507 363/21.02 |

FOREIGN PATENT DOCUMENTS

| | | |
|---|---|---|
| JP | 2010-035270 A | 2/2010 |
| JP | 2011-139586 A | 7/2011 |
| JP | 2013-78228 A | 4/2013 |
| JP | 2013-258860 A | 12/2013 |

* cited by examiner

UNDER CONTROL AT
ON-DUTY RATIO
OF 50%

UNDER CONTROL
IN EMBODIMENT 5

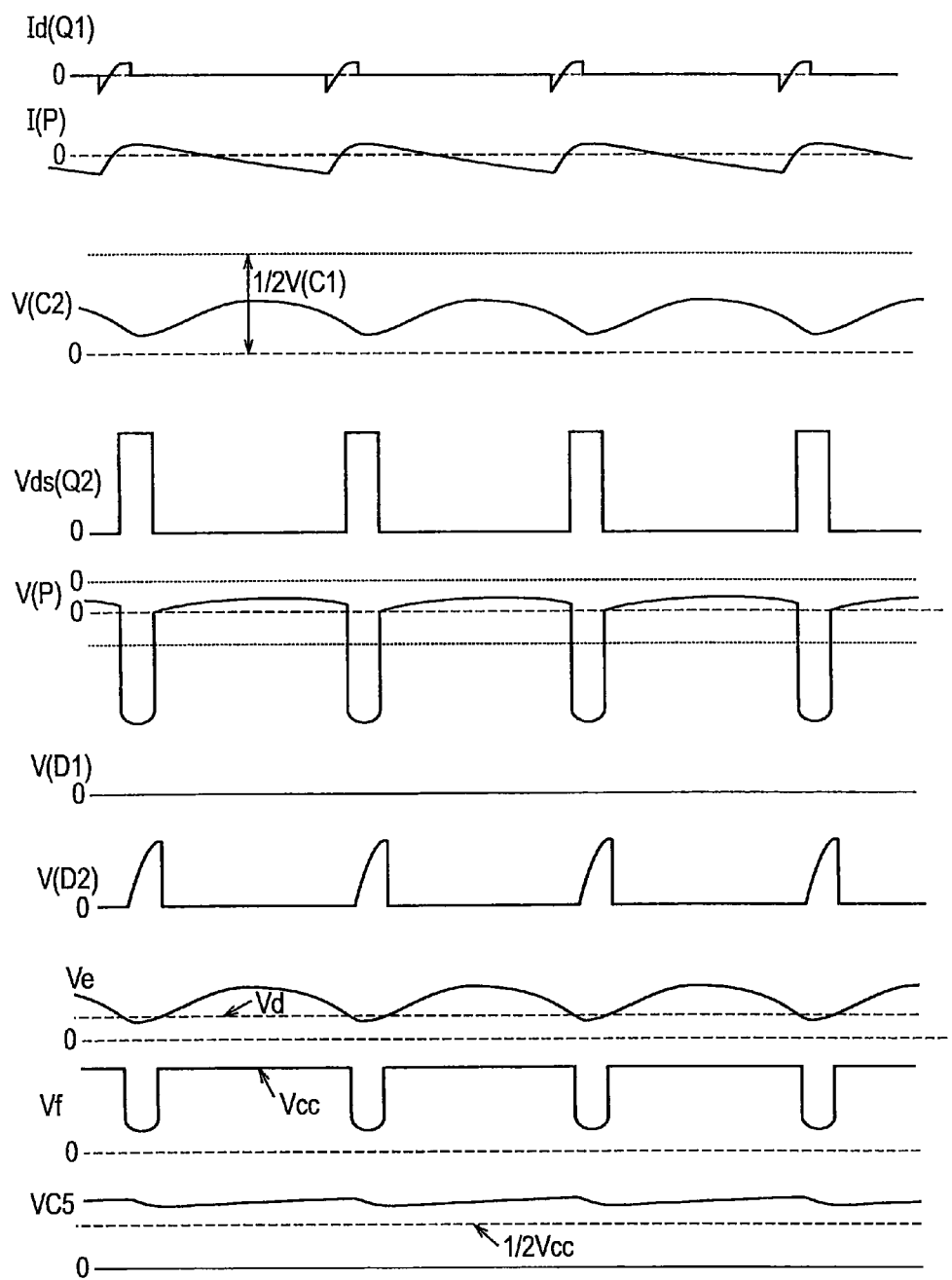

CURRENT RESONANCE TYPE POWER SUPPLY DEVICE

TECHNICAL FIELD

Embodiments of the invention relate to a current resonance type power supply device and more particularly to output voltage control of a current resonance type power supply device under light load.

BACKGROUND ART

FIG. 1 is a circuit diagram illustrating a conventional current resonance type power supply device. In FIG. 1, a smoothing capacitor C1 is connected across output ends of a full-wave rectifier circuit RC1 which rectifies an AC (alternating current) voltage, and a series circuit of a switch element Q1 and a switch element Q2 each constructed of a MOSFET (metal oxide semiconductor field effect transistor) is connected across the output ends of the full-wave rectifier circuit RC1. The switch element Q1 and the switch element Q2 are alternately turned on and off. A series circuit of a resonance reactor Lr, a primary winding P of a transformer T and a current resonance capacitor C2 is connected across ends of the switch element Q2.

A secondary winding S1 and a secondary winding S2 of the transformer T are connected in series, an anode of a diode D1 is connected to one end of the secondary winding S1, and an anode of a diode D2 is connected to one end of the secondary winding S2. A cathode of the diode D1 and a cathode of the diode D2 are connected to one end of a smoothing capacitor C3, and the other end of the smoothing capacitor C3 is connected to a junction of the one end of the secondary winding S1 and the one end of the secondary winding S2. A detector 11 is connected to both ends of the smoothing capacitor C3. Incidentally, a leakage inductance of the transformer T may be used in place of the resonance reactor Lr.

The detector 11 detects an output voltage from the smoothing capacitor C3 and outputs the output voltage to an oscillator 13. The oscillator 13 generates a frequency signal obtained by varying an oscillation frequency according to the output voltage from the smoothing capacitor C3. A comparator CM1 outputs a high level if the frequency signal from the oscillator 13 is equal to or more than a divided voltage obtained by dividing a voltage of a power supply Vcc by a resistor R1 and a resistor R2, or the comparator CM1 outputs a low level if the frequency signal from the oscillator 13 is less than the divided voltage obtained by dividing the voltage of the power supply Vcc by the resistor R1 and the resistor R2.

An inverter IN1 inverts an output from the comparator CM1 and uses the inverted output to turn on or off the switch element Q2. A high-side driver 12 uses the output from the comparator CM1 to turn on or off the switch element Q1.

Next, description will be given with regard to operation of the conventional current resonance type power supply device configured as described above. First, when the switch element Q1 is turned on, an electric current flows through a route from the full-wave rectifier circuit RC1 through the switch element Q1, the resonance reactor Lr, the primary winding P, and the current resonance capacitor C2 to the full-wave rectifier circuit RC1. The electric current is a combined current of an excitation current flowing through an excitation inductance Lp on a primary side of the transformer T, and a load current supplied from an output terminal OUT to a load through the primary winding P, the secondary winding S2, the diode D2, and the capacitor C3. The former current is a resonance current in the form of a sinusoidal wave of (the reactor Lr plus the excitation inductance Lp) and the current resonance capacitor C2, and is observed as a current in which a portion of the sinusoidal wave is in the form of a triangle wave, since the current is set to a lower resonance frequency than that during an ON period of the switch element Q1. The latter current is a resonance current in the form of a sinusoidal wave in which a resonance element of the reactor Lr and the current resonance capacitor C2 appears.

When the switch element Q1 is turned off, energy of the excitation current stored in the transformer T produces voltage pseudo-resonance by (the reactor Lr plus the excitation inductance Lp) and the current resonance capacitor C2, and a voltage resonance capacitor Crv (not illustrated) on both ends of the switch element Q2. At this time, a resonance frequency generated by the voltage resonance capacitor Crv having a small capacitance is observed as a voltage across the switch element Q1 and the switch element Q2. In other words, the current of the switch element Q1 shifts to the voltage resonance capacitor Crv as soon as the switch element Q1 is turned off. When the voltage resonance capacitor Crv is discharged to zero volt, the current shifts to an internal diode of the switch element Q2. The energy of the excitation current stored in the transformer T charges the current resonance capacitor C2 through the internal diode of the switch element Q2. During this period, the switch element Q2 is turned on thereby to enable the switch element Q2 to switch at a zero volt.

When the switch element Q2 is turned on, with the current resonance capacitor C2 acting as a power supply, an electric current flows through a route from the current resonance capacitor C2 through the primary winding P, the resonance reactor Lr, and the switch element Q2 to the current resonance capacitor C2. The electric current is a combined current of an excitation current flowing through the excitation inductance Lp of the transformer T, and a load current supplied from the output terminal OUT to the load through the primary winding P, the secondary winding S1, the diode D1, and the smoothing capacitor C3. The former current is a resonance current in the form of a sinusoidal wave of (the reactor Lr plus the excitation inductance Lp) and the current resonance capacitor C2, and is observed as a current in which a portion of the sinusoidal wave is in the form of a triangle wave, since the current is set to a lower resonance frequency than that during an ON period of the switch element Q2. The latter current is a resonance current in the form of a sinusoidal wave in which a resonance element of the reactor Lr and the current resonance capacitor C2 appears.

When the switch element Q2 is turned off, energy of the excitation current stored in the transformer T produces voltage pseudo-resonance by (the reactor Lr plus the excitation inductance Lp) and the current resonance capacitor C2, and the voltage resonance capacitor Crv. At this time, a resonance frequency generated by the voltage resonance capacitor Crv having a small capacitance is observed as a voltage across the switch element Q1 and the switch element Q2. In other words, the current of the switch element Q2 shifts to the voltage resonance capacitor Crv as soon as the switch element Q2 is turned off. When the voltage resonance capacitor Crv is discharged to the output voltage from the smoothing capacitor C1, the current shifts to an internal diode of the switch element Q1. The energy of the excitation current stored in the transformer T is regenerated to the smoothing capacitor C1 through the internal diode of the switch element Q1. During this period, the switch element Q1 is turned on thereby to enable the switch element Q1 to switch at a zero volt.

FIG. 2 illustrates waveforms of portions of the conventional current resonance type power supply device under light load. In FIG. 2, Id(Q1) represents a drain current of the switch element Q1; I(P), a current flowing through the primary winding P; V(C2), a voltage across ends of the current resonance capacitor C2; Vds(Q2), a drain-source voltage of the switch element Q2; V(P), a voltage across ends of the primary winding P; V(D1), a voltage across ends of the diode D1; and V(D2), a voltage across ends of the diode D2.

Also, in the conventional current resonance type power supply device, the switch element Q1 and the switch element Q2 are repeatedly alternately turned on and off at a duty ratio of 50% to control a switching frequency and thereby control an output voltage. At this time, as illustrated in FIG. 2, the voltage V(C2) of the current resonance capacitor C2 repeats charging and discharging symmetrically about ½ of a voltage across ends of a voltage V(C1) of the smoothing capacitor C1. Thereby, the voltage V(P) is generated in the primary winding P, a voltage is generated in the secondary windings S1, S2, and the voltage is rectified by the diodes D1, D2 thereby to obtain an output voltage.

Incidentally, current resonance type power supply devices described for example in Japanese Patent Application Publication No. 2013-78228, Japanese Unexamined Patent Application Publication No. Hei 7-135769, U.S. Patent Application Publication No. 2005-0157522, and U.S. Pat. No. 8,213,189 are known as the related art of the prior art.

However, if the conventional current resonance type power supply device is controlled at varying duty ratios in order to increase efficiency under light load, the power supply device performs intermittent operation because the amount of energy fed to a secondary side within one cycle becomes large when an input voltage becomes large under a light-load condition. When the intermittent operation is performed, an output voltage exceeds its constant voltage control range.

Embodiments of the invention provide a current resonance type power supply device capable of controlling an output voltage with stability even under a light-load condition.

SUMMARY OF INVENTION

A current resonance type power supply device according to a first aspect of the invention includes: a first switch element and a second switch element connected in series across ends of a DC (direct current) power supply; a series circuit connected to a junction of the first switch element and the second switch element and to one end of the DC power supply, and having a series connection of a primary winding of a transformer and a capacitor; a rectifier/smoothing circuit configured to rectify and smooth a voltage generated in a secondary winding of the transformer thereby to extract a DC voltage; a control circuit configured to alternately turn on and off the first switch element and the second switch element; a voltage detector configured to detect a voltage of the DC power supply; and a duty controller configured to, under a light-load condition, set a duty ratio between the first switch element and the second switch element closer to 50% as a value of the voltage detected by the voltage detector becomes larger.

BRIEF DESCRIPTION OF DRAWINGS

FIG. 17 is a chart illustrating waveforms of the portions of the current resonance type power supply device according to Embodiment 5 under light load.

DESCRIPTION OF EMBODIMENTS

Some embodiments of a current resonance type power supply device will be described in detail below with reference to the drawings.

Embodiment 1

Figure 3:
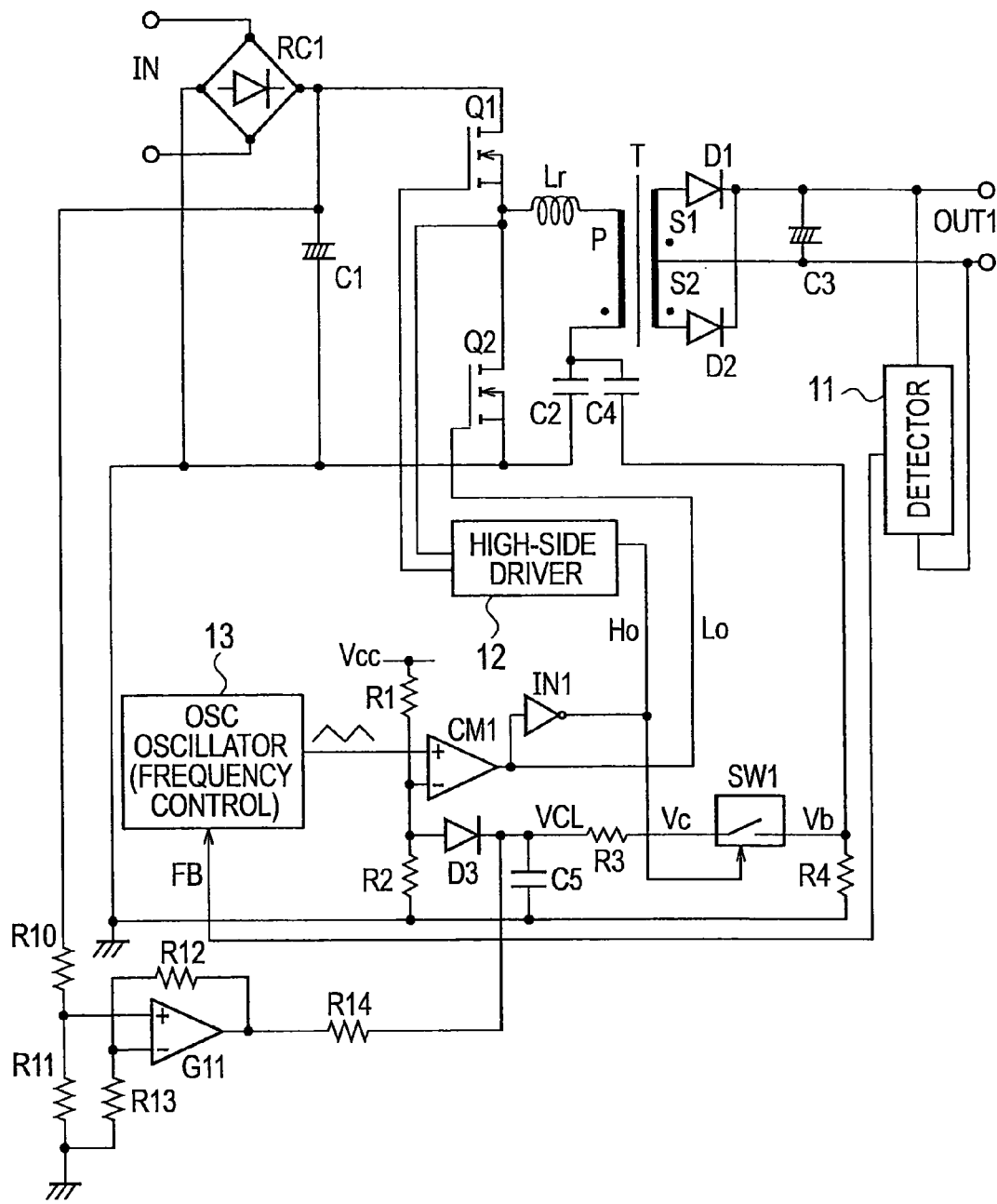
FIG. 3 is a circuit diagram of a current resonance type power supply device according to Embodiment 1.

FIG. 3 is a circuit diagram of a current resonance type power supply device according to Embodiment 1. The current resonance type power supply device of Embodiment 1 illustrated in FIG. 3 includes a control circuit which sets a first ON time of a switch element Q1 and a second ON time of a switch element Q2 to the same predetermined time and alternately turns on and off the switch element Q1 and the switch element Q2. In other words, a duty ratio is set to 50%.

Figure 1:
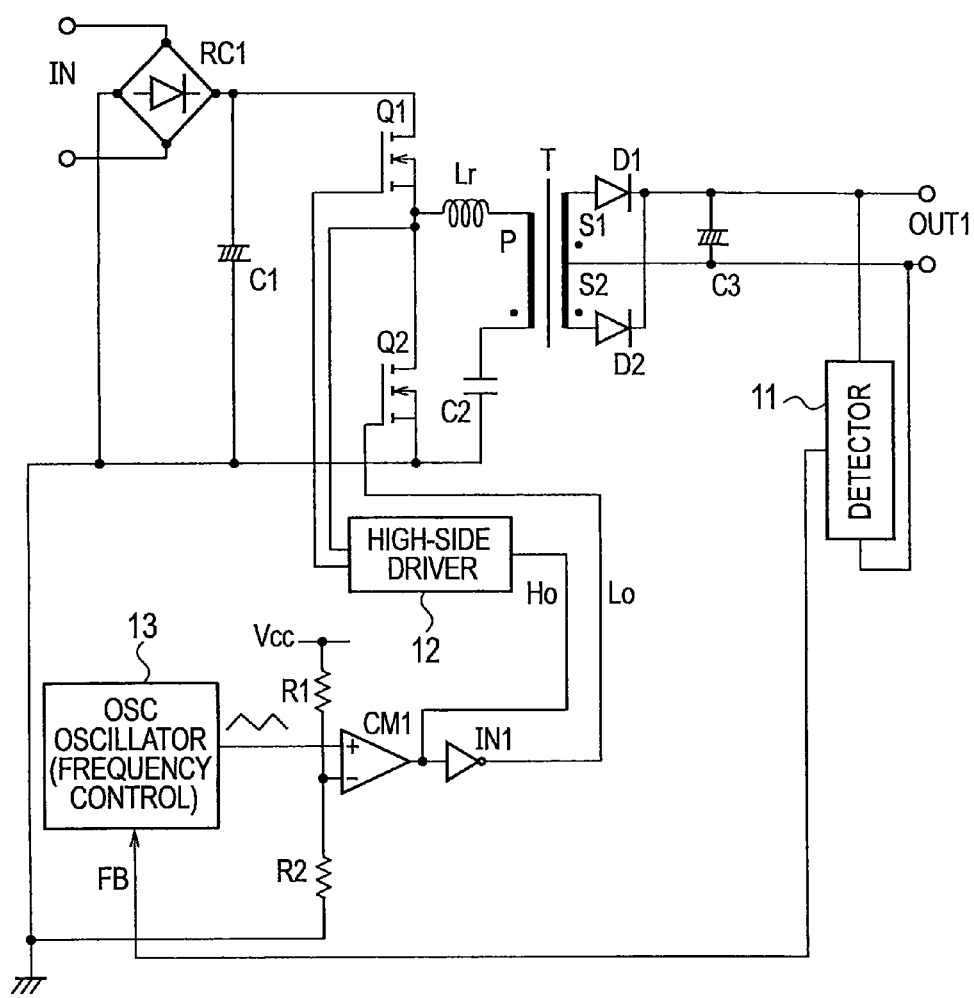
FIG. 1 is a circuit diagram illustrating a conventional current resonance type power supply device.

The current resonance type power supply device of Embodiment 1 includes a first ON time controller including capacitors C4, C5, resistors R3, R4, a switch SW1, and a diode D3, in addition to the configuration of the conventional current resonance type power supply device illustrated in FIG. 1.

The first ON time controller sets one of a first ON time Tho of the switch element Q1 and a second ON time Tlo of the switch element Q2, shorter than a predetermined time, and sets the other of the first ON time Tho and the second ON time Tlo longer than the predetermined time, under a light-load condition based on a value of a current detected by the capacitor C4.

One end of the capacitor C4 is connected to one end of a primary winding P of a transformer T and one end of a capacitor C2, and forms a current detector configured to detect a current flowing through the primary winding P of the transformer T. One end of the resistor R4 and one end of the switch SW1 are connected to the other end of the capacitor C4, and the other end of the resistor R4 is grounded.

The other end of the switch SW1 is connected to one end of the resistor R3, one end of the capacitor C5 and a cathode of the diode D3 are connected to the other end of the resistor R3, and the other end of the capacitor C5 is grounded. An anode of the diode D3 is connected to one end of a resistor R2, one end of a resistor R1 and an inverting input terminal of a comparator CM1. An input terminal of an inverter IN1 is connected to an output terminal of the comparator CM1, and a gate of the switch element Q2 is also connected to the output terminal of the comparator CM1. An output terminal of the inverter IN1 is connected to a high-side driver 12.

Also, one end of a resistor R10 is connected to one end of a smoothing capacitor C1 and an output end of a full-wave rectifier circuit RC1, and one end of a resistor R11 and a non-inverting input terminal of an operational amplifier G11 are connected to the other end of the resistor R10. The resistor R10 and the resistor R11 form a voltage detector configured to detect a voltage of the smoothing capacitor C1 as a DC (direct current) power supply.

The other end of the resistor R11 is grounded, and one end of a resistor R12 and one end of a resistor R13 are connected to an inverting input terminal of the operational amplifier G11. The other end of the resistor R13 is grounded, the other end of the resistor R12 is connected to an output terminal of the operational amplifier G11 and one end of a resistor R14, and the other end of the resistor R14 is connected to the one end of the capacitor C5.

The operational amplifier G11 compares a divided voltage obtained by dividing the voltage of the smoothing capacitor C1 by the resistor R10 and the resistor R11, with a voltage across ends of the resistor R13, and provides an output voltage to the capacitor C5. In other words, the operational amplifier G11 forms a duty controller configured to, under a light-load condition, provide a larger output voltage to the capacitor C5 as a value of an input voltage of the smoothing capacitor C1 detected by the resistor R10 and the resistor R11 becomes larger, thereby to increase a voltage of the capacitor C5 so that the duty ratio between the switch element Q1 and the switch element Q2 approaches 50%.

Note that the switch element Q1 corresponds to a first switch element, and the switch element Q2 corresponds to a second switch element. Diodes D1, D2 and a smoothing capacitor C3 form a rectifier/smoothing circuit configured to rectify and smooth a voltage generated in secondary windings S1, S2 of the transformer T and thereby extract a DC voltage.

Figure 4A:
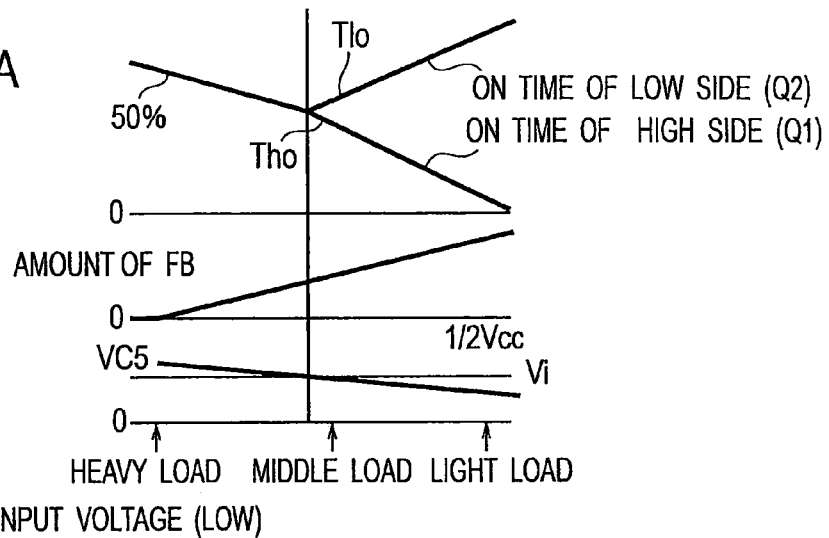
FIGS. 4A to 4C are graphs illustrating relationships among an ON time of a low-side switch element, an ON time of a high-side switch element, the amount of feedback, a load condition, and an input voltage under light load, in the current resonance type power supply device according to Embodiment 1.
Figure 4B:
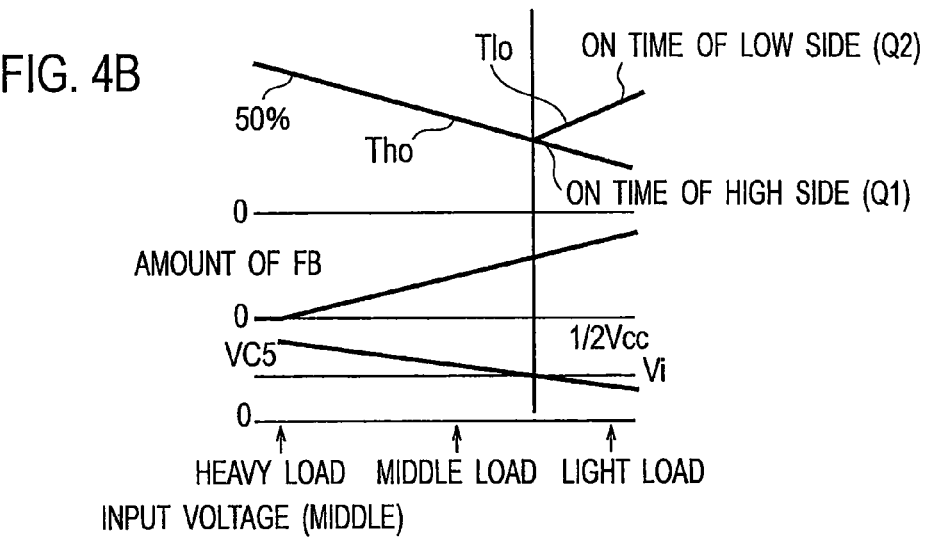
Figure 4C:
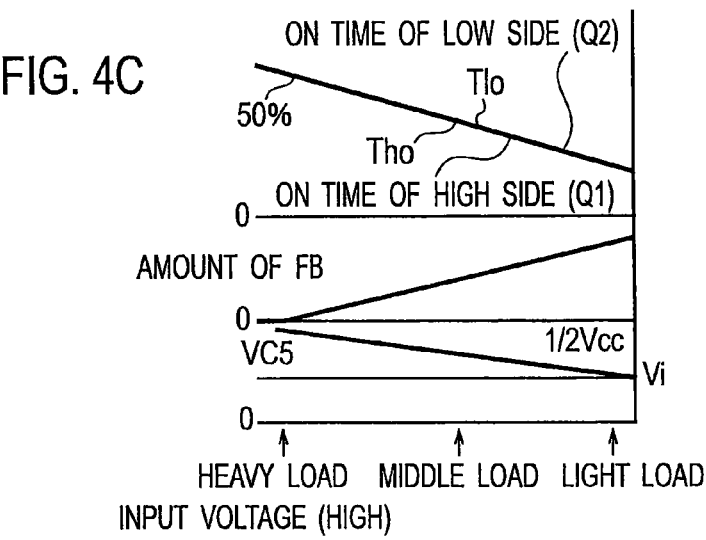

Next, detailed description will be given with reference to FIGS. 3 and 4 with regard to operation of the current resonance type power supply device of Embodiment 1 thus configured. FIG. 4 illustrates relationships among the ON time of a low-side switch element, the ON time of a high-side switch element, the amount of feedback, a load condition, and an input voltage under light load, in the current resonance type power supply device of Embodiment 1. FIG. 4A illustrates a case where the input voltage is low; FIG. 4B, a case where the input voltage is middle; and FIG. 4C, a case where the input voltage is high. In FIG. 4, the amount of FB refers to the amount of feedback, and VC5 denotes the voltage of the capacitor C5.

First, when the switch element Q1 is ON, a current flows through the primary winding P of the transformer T, and thus, the capacitor C4 detects the current flowing through the primary winding P of the transformer T and outputs the current to the resistor R4.

Also, when the switch element Q1 is ON, the inverter IN1 outputs a high level, and thus, the switch SW1 is turned on. Thus, a voltage generated in the resistor R4 is integrated by an integrating circuit of the resistor R3 and the capacitor C5, and the capacitor C5 obtains an average value of current across its ends. The average value of current is small under a light-load condition and is large under a heavy-load condition.

Thus, under the light-load condition, a reference voltage at a junction of the resistor R1 and the resistor R2 is lower than a reference voltage under the heavy-load condition. When a triangle wave signal from an oscillator 13 is equal to or more than the reference voltage, the comparator CM1 outputs a high level to the switch element Q2 to turn on the switch element Q2; meanwhile, when the triangle wave signal is less than the reference voltage, the comparator CM1 outputs a low level to the switch element Q2 to turn off the switch element Q2. Under the light-load condition, the reference voltage is lower than the reference voltage under the heavy-load condition, and thus, a high level period becomes long, so that the ON time Tlo of the switch element Q2 becomes long in the case where the input voltage is low and in the case where the input voltage is middle, as illustrated in FIGS. 4A and 4B.

Meanwhile, the inverter IN1 inverts the output from the comparator CM1, and, when the triangle wave signal from the oscillator 13 is less than the reference voltage, the inverter IN1 outputs a high level to the switch element Q1 to turn on the switch element Q1; meanwhile, when the triangle wave signal is equal to or more than the reference voltage, the inverter IN1 outputs a low level to the switch element Q1 to turn off the switch element Q1. Thus, under the light-load condition, the reference voltage is lower than the reference voltage under the heavy-load condition, and thus, the high level period becomes short, so that the ON time Tho of the switch element Q1 becomes short as illustrated in FIGS. 4A and 4B.

Thus, the current resonance capacitor C2 is charged or discharged about a voltage across ends of the smoothing capacitor C1 or a voltage close to 0V, and thereby, a sufficient voltage can be applied to the primary winding P even though a charging/discharging current is small.

In other words, under the light-load condition, the ON/OFF time of the switch element Q1 and the switch element Q2 is set variable to change the duty ratio from 50% and thereby enable reducing the charging/discharging current and loss of the current resonance capacitor C2 and hence improving efficiency.

However, under the light-load condition, when the input voltage becomes large, the input voltage exceeds a constant voltage control range, and thus, it is necessary to return to control such that the duty ratio approaches 50%, and the input voltage from the smoothing capacitor C1 is detected by the resistor R10 and the resistor R11. Under the light-load condition, the operational amplifier G11 provides a larger output voltage to the capacitor C5 as the value of the input voltage of the smoothing capacitor C1 detected by the resistor R10 and the resistor R11 becomes larger.

Thus, the voltage VC5 of the capacitor C5 increases, and thus, the voltage VC5 of the capacitor C5 under the light-load condition becomes substantially the same as a reference voltage Vi at the junction of the resistor R1 and the resistor R2, as illustrated in FIG. 4C. Therefore, under the light-load condition and when the input voltage is large, the ON time Tho of the switch element Q1 can become the same as the ON time Tlo of the switch element Q2, as illustrated in FIG. 4C. In other words, the duty ratio between the switch element Q1 and the switch element Q2 can approach 50%, and thus constant voltage accuracy of output voltage can be stabilized under the light-load condition.

Embodiment 2

Figure 5:
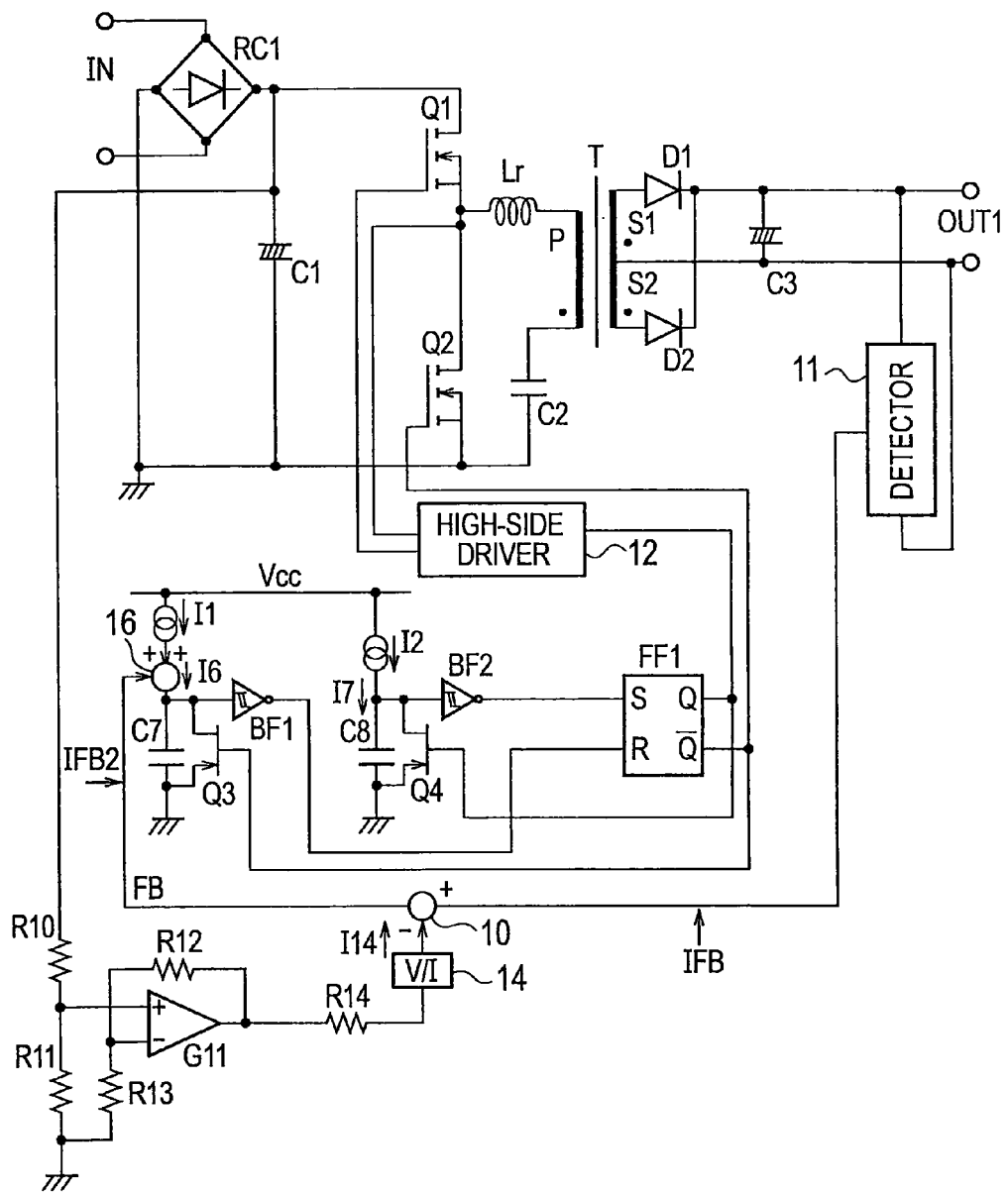
FIG. 5 is a circuit diagram of a current resonance type power supply device according to Embodiment 2.

FIG. 5 is a circuit diagram of a current resonance type power supply device according to Embodiment 2. The current resonance type power supply device of Embodiment 2 illustrated in FIG. 5 includes a control circuit which sets the first ON time of the switch element Q1 and the second ON time of the switch element Q2 to the same predetermined time and alternately turns on and off the switch element Q1 and the switch element Q2. In other words, the duty ratio is set to 50%.

The control circuit acts as a circuit to set the first ON time Tho of the switch element Q1 and includes a current source I1, an adder 16, a capacitor C7, a MOSFET Q3, a buffer BF1, and a flip-flop circuit FF1.

The control circuit acts as a circuit to set the second ON time Tlo of the switch element Q2 and includes a current source I2, a capacitor C8, a MOSFET Q4, a buffer BF2, and the flip-flop circuit FF1.

Also, under a light-load condition where there is a large amount of feedback (or amount of FB) based on a DC voltage detected by a detector 11, the adder 16 adds a current of the current source I1 and a larger feedback current IFB together thereby to increase a current I6 and thus set the first ON time Tho of the switch element Q1 shorter than a predetermined time. The current source I1 and the adder 16 form a second ON time controller.

Next, description will be given with regard to a configuration of connection of the control circuit. One end of the current source I1 is connected to a power supply Vcc, and the other end of the current source I1 is connected via the adder 16 to one end of the capacitor C7, a drain of the MOSFET Q3 and an input end of the buffer BF1. The other end of the capacitor C7 and a source of the MOSFET Q3 are grounded. A gate of the MOSFET Q3 is connected to an inverting output terminal Qb of the flip-flop circuit FF1 and a gate of the switch element Q2 on a low side. An output terminal of the buffer BF1 is connected to a reset terminal R of the flip-flop circuit FF1.

The adder 16 adds together the current of the current source I1 and the feedback current IFB according to the amount of feedback FB detected by the detector 11 and charges the capacitor C7 with the added current.

One end of the current source I2 is connected to the power supply Vcc, and the other end of the current source I2 is connected to one end of the capacitor C8, a drain of the MOSFET Q4 and an input end of the buffer BF2. The other end of the capacitor C8 and a source of the MOSFET Q4 are grounded. A gate of the MOSFET Q4 is connected to an output terminal Q of the flip-flop circuit FF1 and the high-side driver 12. An output terminal of the buffer BF2 is connected to a set terminal S of the flip-flop circuit FF1.

Connections between the resistors R10, R11, R12, R13, R14 and the operational amplifier G11 are as described with reference to FIG. 3, and thus, description of the connections will be omitted here.

A V/I circuit 14 converts a voltage from the resistor R14 into a current I14 and outputs the current I14 to an adder 10. The adder 10 subtracts the current I14 from the V/I (voltage-current converter) 14 from the feedback current IFB from the detector 11 and provides a subtracted output as a feedback current IFB2 to the adder 16.

In other words, the adder 10 forms a duty controller configured to, when an input is high, provide a smaller output current to the adder 16 as the value of the input voltage of the smoothing capacitor C1 detected by the resistor R10 and the resistor R11 becomes larger, thereby to reduce an output of the adder 16 so that the duty ratio between the switch element Q1 and the switch element Q2 approaches 50%.

Figure 6A:
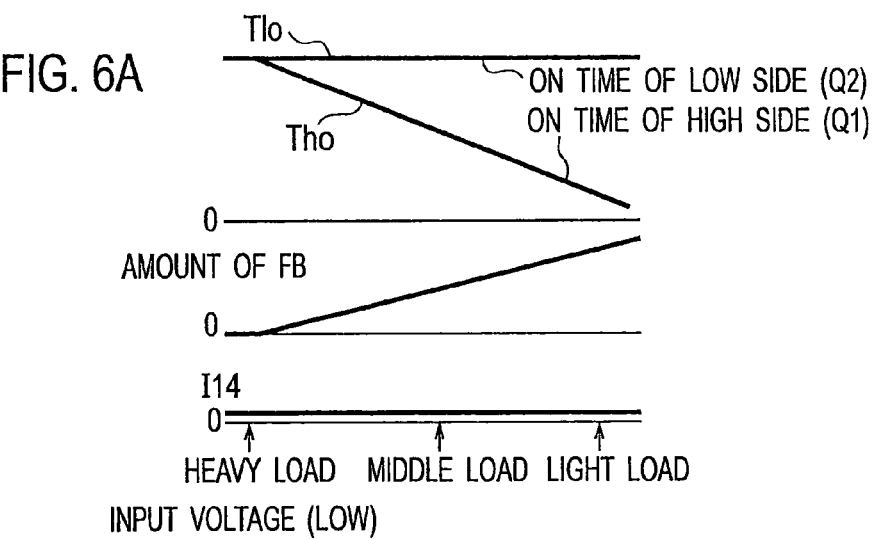
FIGS. 6A to 6C are graphs illustrating relationships among the ON time of the low-side switch element, the ON time of the high-side switch element, the amount of feedback, the load condition, and the input voltage under light load, in the current resonance type power supply device according to Embodiment 2.
Figure 6B:
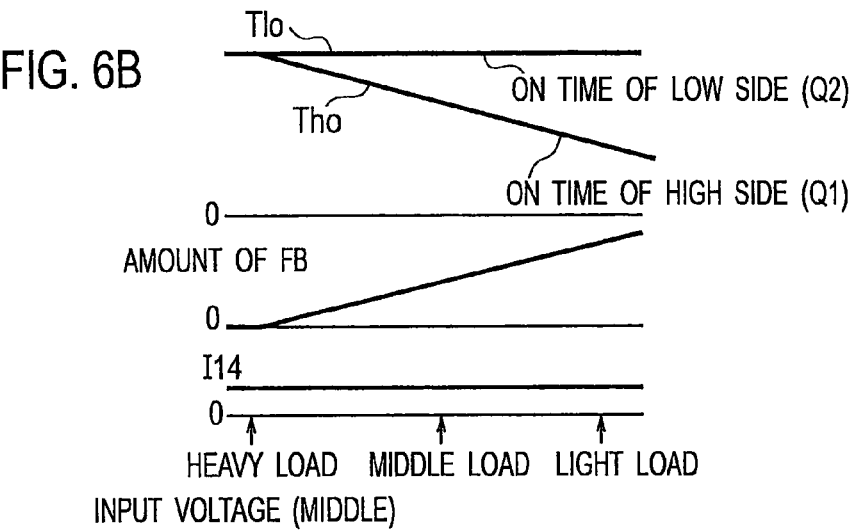
Figure 6C:
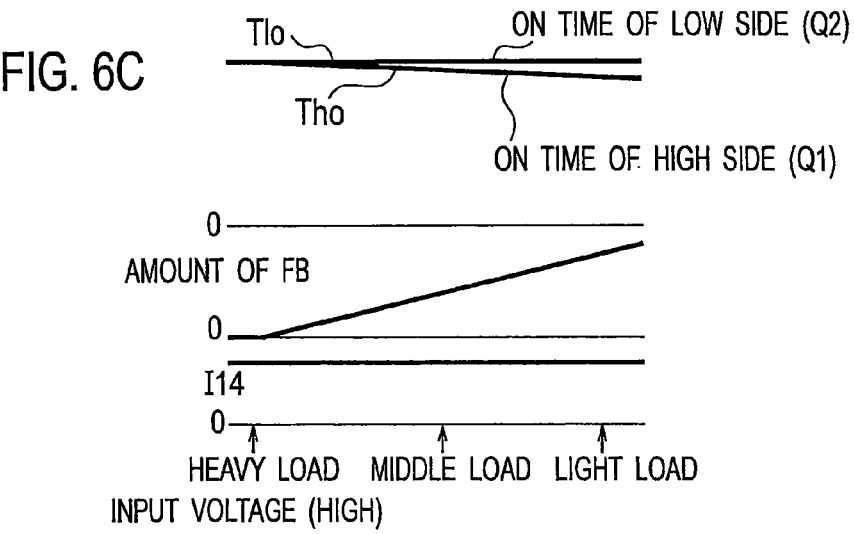

Next, detailed description will be given with reference to FIGS. 5 and 6 with regard to operation of the current resonance type power supply device of Embodiment 2 thus configured. FIG. 6 illustrates relationships among the ON time of the low-side switch element, the ON time of the high-side switch element, the amount of feedback, the load condition, and the input voltage under light load, in the current resonance type power supply device of Embodiment 2. FIG. 6A illustrates a case where the input voltage is low; FIG. 6B, a case where the input voltage is middle; and FIG. 6C, a case where the input voltage is high. In FIG. 6, the amount of FB refers to the amount of feedback, and I14 denotes the output current from the V/I 14.

Firstly, operation under a heavy-load condition will be described. First, it is assumed that the capacitor C8 is in a charged state. At this time, the buffer BF2 outputs a high level to the set terminal S of the flip-flop circuit FF1, and thus, the output terminal Q of the flip-flop circuit FF1 outputs the high level to the high-side driver 12. Thus, the switch element Q1 is turned on.

At this time, the output terminal Q of the flip-flop circuit FF1 outputs the high level to the gate of the MOSFET Q4, and thus, the MOSFET Q4 is turned on. Thus, an electric charge of the capacitor C8 is discharged. Also, the output terminal Qb of the flip-flop circuit FF1 outputs a low level to the gate of the MOSFET Q3, and thus, the MOSFET Q3 is turned off.

Then, when the current of the current source I1 added by the adder 16 and the feedback current IFB2 flow through the capacitor C7, the capacitor C7 is charged and its voltage rises.

When the voltage of the capacitor C7 exceeds a predetermined value, the buffer BF1 outputs a high level to the reset terminal R of the flip-flop circuit FF1, and thus, the inverting output terminal Qb of the flip-flop circuit FF1 outputs the high level to the gate of the switch element Q2. Thus, the switch element Q2 is turned on. Also, the inverting output terminal Qb of the flip-flop circuit FF1 outputs the high level to the gate of the MOSFET Q3, and thus, the MOSFET Q3 is turned on. Thus, the capacitor C7 is discharged.

Also, the output terminal Q of the flip-flop circuit FF1 outputs a low level to the gate of the MOSFET Q4, and thus, the MOSFET Q4 is turned off. Thus, a voltage of the capacitor C8 rises.

Also, the output terminal Q of the flip-flop circuit FF1 outputs the low level to the high-side driver 12, and thus, the switch element Q1 is turned off.

Under the heavy-load condition, as illustrated in FIG. 6, the amount of feedback is small, and thus, the feedback current IFB is also small, so that a charging time required for the voltage of the capacitor C7 to reach the predetermined value becomes longer.

Meanwhile, under the light-load condition, as illustrated in FIG. 6, the amount of feedback is large, and thus, the feedback current IFB is also large, so that the charging time required for the voltage of the capacitor C7 to reach the predetermined value becomes shorter. Thus, as illustrated in FIG. 6, the ON time Tho of the switch element Q1 is long under the heavy-load condition and is short under the light-load condition.

Meanwhile, the ON time Tlo of the switch element Q2 is determined by the constant current source I2, the capacitor C8, a switch element Q8, the buffer BF2 and the flip-flop circuit FF1 and is not affected by the feedback current from the detector 11 or the current from the V/I 14 and thus remains constant regardless of the load condition, as illustrated in FIG. 6.

Also, under the light-load condition, when the input voltage becomes large, the input voltage exceeds the constant voltage control range, and thus, it is necessary to return to control such that the duty ratio approaches 50%, and the input voltage from the smoothing capacitor C1 is detected by the resistor R10 and the resistor R11. Under the light-load condition, the operational amplifier G11 provides a larger output voltage to the adder 10 via the resistor R14 and the V/I 14 as the value of the input voltage of the smoothing capacitor C1 detected by the resistor R10 and the resistor R11 becomes larger.

The adder 10 subtracts the current I14 from the V/I 14 from the feedback current IFB from the detector 11 and outputs IFB2. Thus, even under the light-load condition, the output current IFB2 from the adder 10 is smaller than the output when the input voltage is low and when the input voltage is middle, and thus, a smaller output from the adder 10 is inputted to the adder 16. Thus, the ON time Tho of the switch element Q1 becomes long.

Therefore, under the light-load condition and when the input voltage is large, the ON time Tho of the switch element Q1 can become substantially the same as the ON time Tlo of the switch element Q2, as illustrated in FIG. 6C. In other words, the duty ratio between the switch element Q1 and the switch element Q2 can approach 50%, and thus the constant voltage accuracy of the output can be stabilized under the light-load condition.

Embodiment 3

Figure 7:
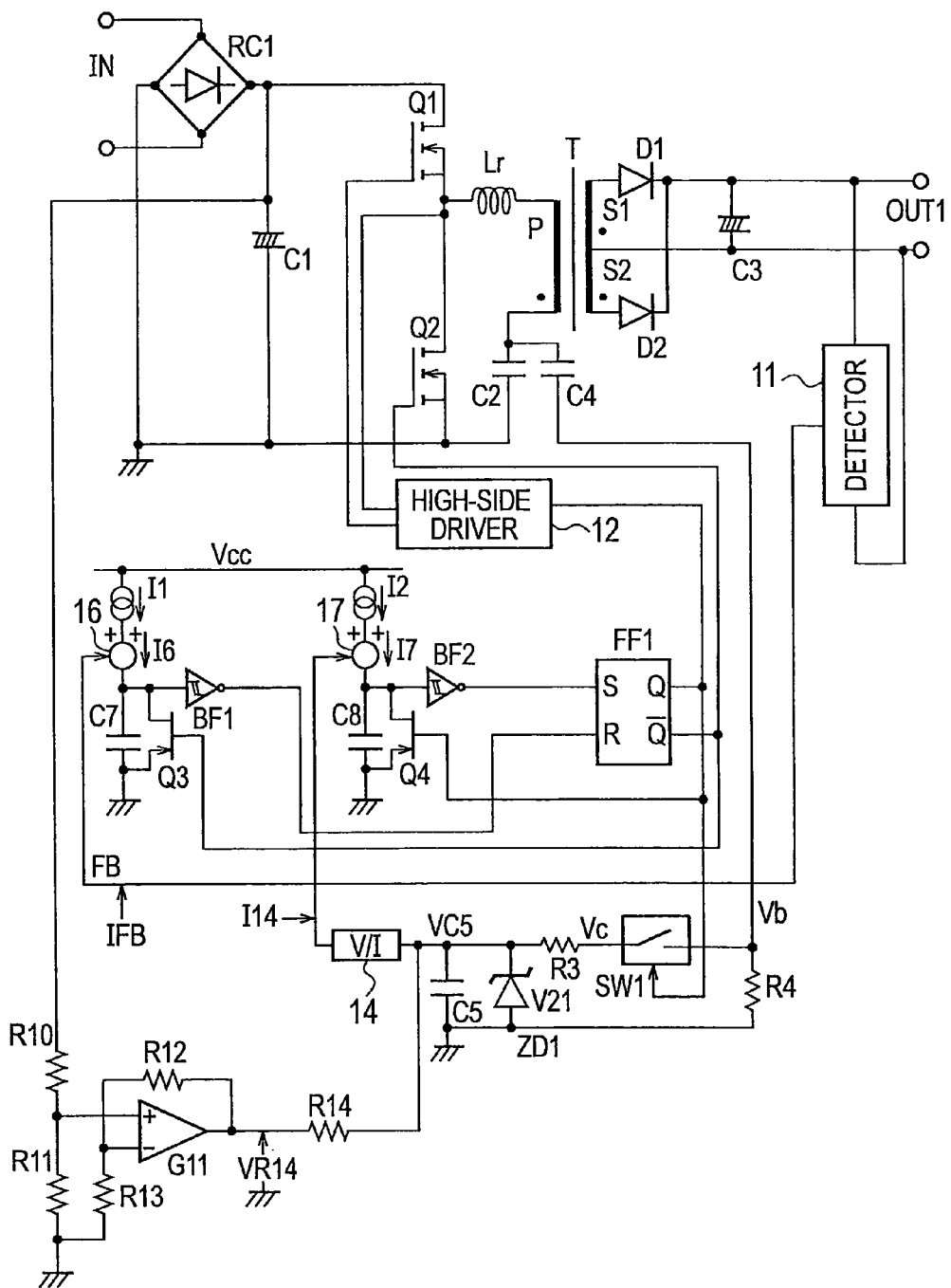
FIG. 7 is a circuit diagram of a current resonance type power supply device according to Embodiment 3.

FIG. 7 is a circuit diagram of a current resonance type power supply device according to Embodiment 3. The current resonance type power supply device of Embodiment 3 illustrated in FIG. 7 is characterized by excluding the adder 10 and further including a third ON time controller including an adder 17, the capacitors C4, C5, the resistors R3, R4, the switch SW1, and a Zener diode ZD1, as compared to the current resonance type power supply device of Embodiment 2 illustrated in FIG. 5.

The third ON time controller sets the second ON time Tlo of the switch element Q2 longer than a predetermined time, based on an average value of current detected by the capacitor C4, when an average current value of the switch element Q1 is small, or equivalently, under a light-load condition, and the third ON time controller sets the second ON time Tlo of the switch element Q2 shorter than the predetermined time, when the average current value of the switch element Q1 is large, or equivalently, under a heavy-load condition.

One end of the capacitor C4 is connected to one end of the primary winding P of the transformer T and one end of the capacitor C2, and forms a current detector configured to detect a current flowing through the primary winding P of the transformer T. One end of the resistor R4 and one end of the switch SW1 are connected to the other end of the capacitor C4, and the other end of the resistor R4 is grounded.

The other end of the switch SW1 is connected to one end of the resistor R3, the other end of the resistor R3 is connected to one end of the capacitor C5 and an input terminal of the V/I 14, and the other end of the capacitor C5 is grounded. The Zener diode ZD1 is connected across ends of the capacitor C5. An output terminal of the V/I 14 is connected to the adder 17. The adder 17 adds a current from the current source I2 and a current from the V/I 14 together and charges the capacitor C8.

The other end of the resistor R14 is connected to the one end of the capacitor C5 and an input side of the V/I 14. The operational amplifier G11 forms a duty controller configured to provide a larger output voltage to the capacitor C5 as the value of the input voltage of the smoothing capacitor C1 detected by the resistor R10 and the resistor R11 becomes larger, thereby to, under the light-load condition, increase the voltage of the capacitor C5 so that the duty ratio between the switch element Q1 and the switch element Q2 approaches 50%.

Figure 8A:
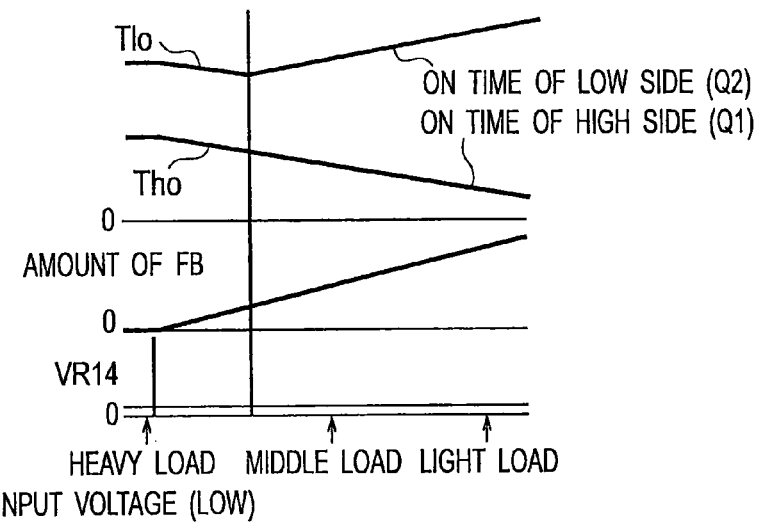
FIGS. 8A to 8C are graphs illustrating relationships among the ON time of the low-side switch element, the ON time of the high-side switch element, the amount of feedback, the load condition, and the input voltage under light load, in the current resonance type power supply device according to Embodiment 3.
Figure 8B:
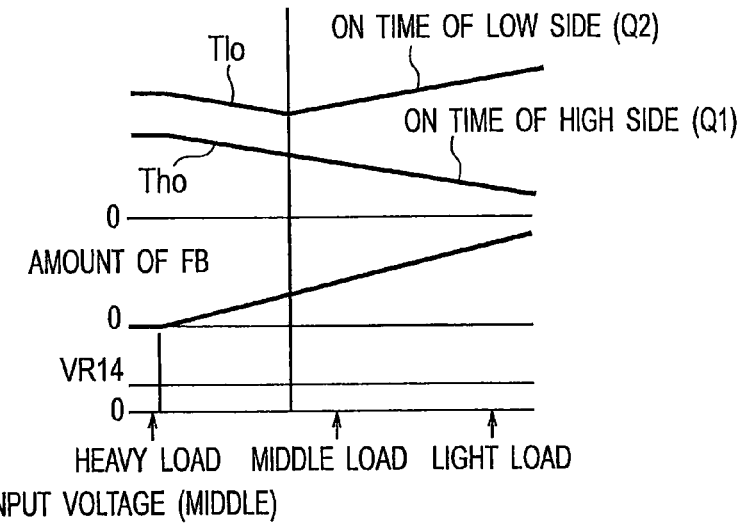
Figure 8C:
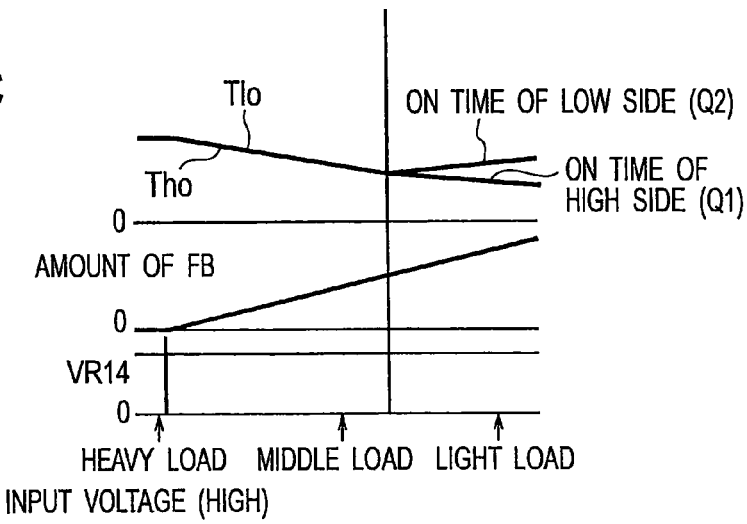
Figure 9:
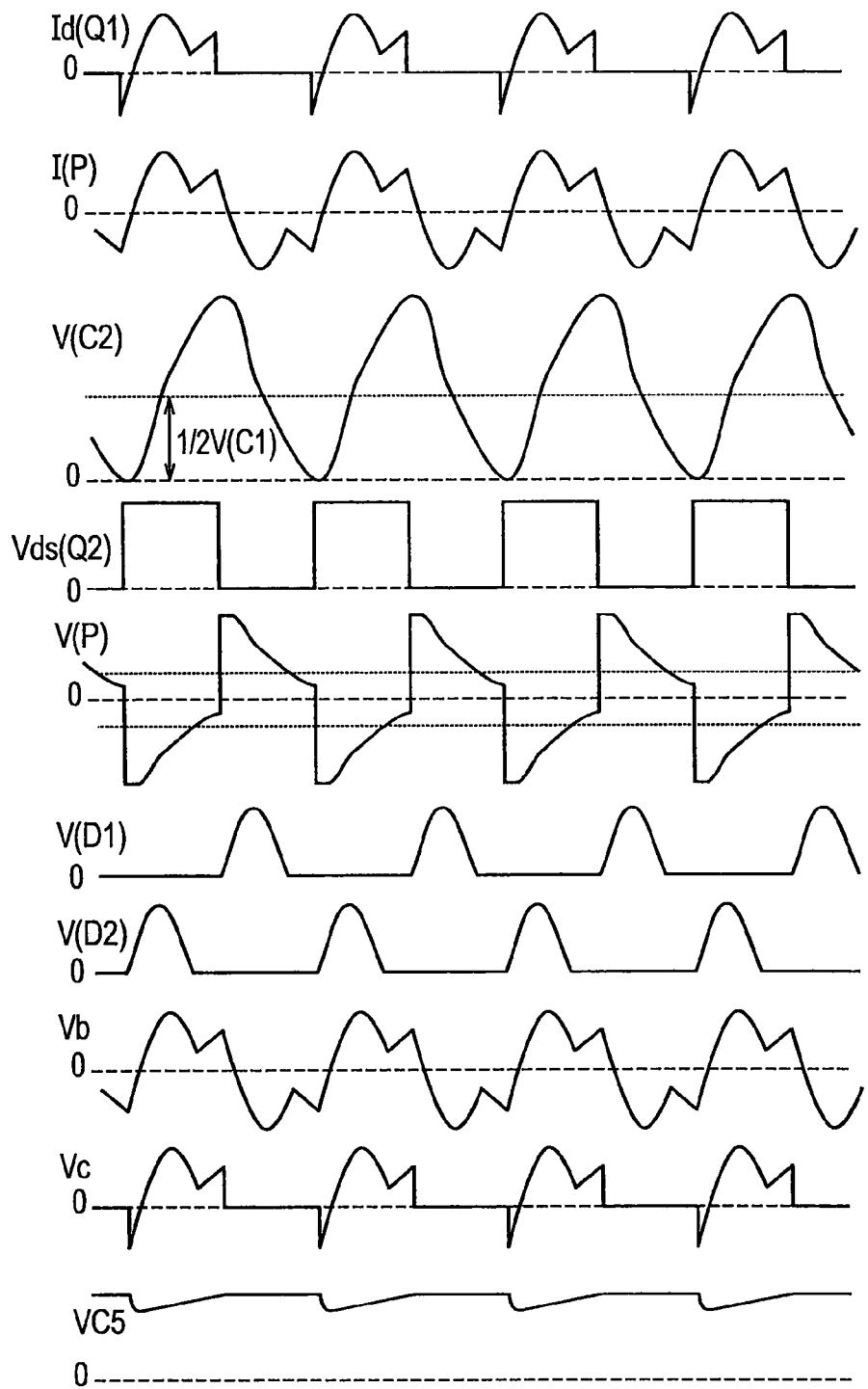
FIG. 9 is a chart illustrating waveforms of the portions of the current resonance type power supply device according to Embodiment 3 under heavy load.
Figure 10:
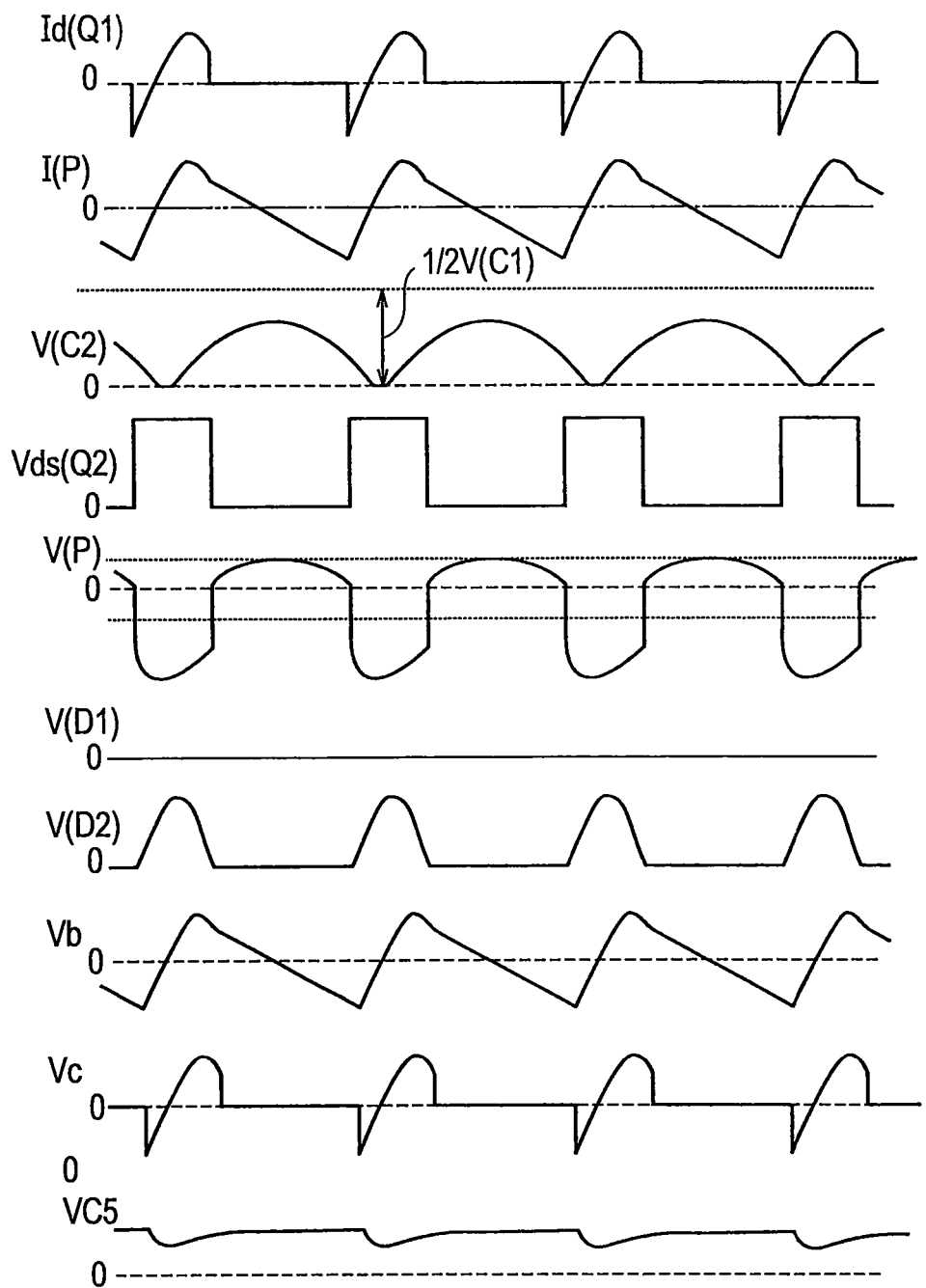
FIG. 10 is a chart illustrating waveforms of the portions of the current resonance type power supply device according to Embodiment 3 under middle load.
Figure 11:
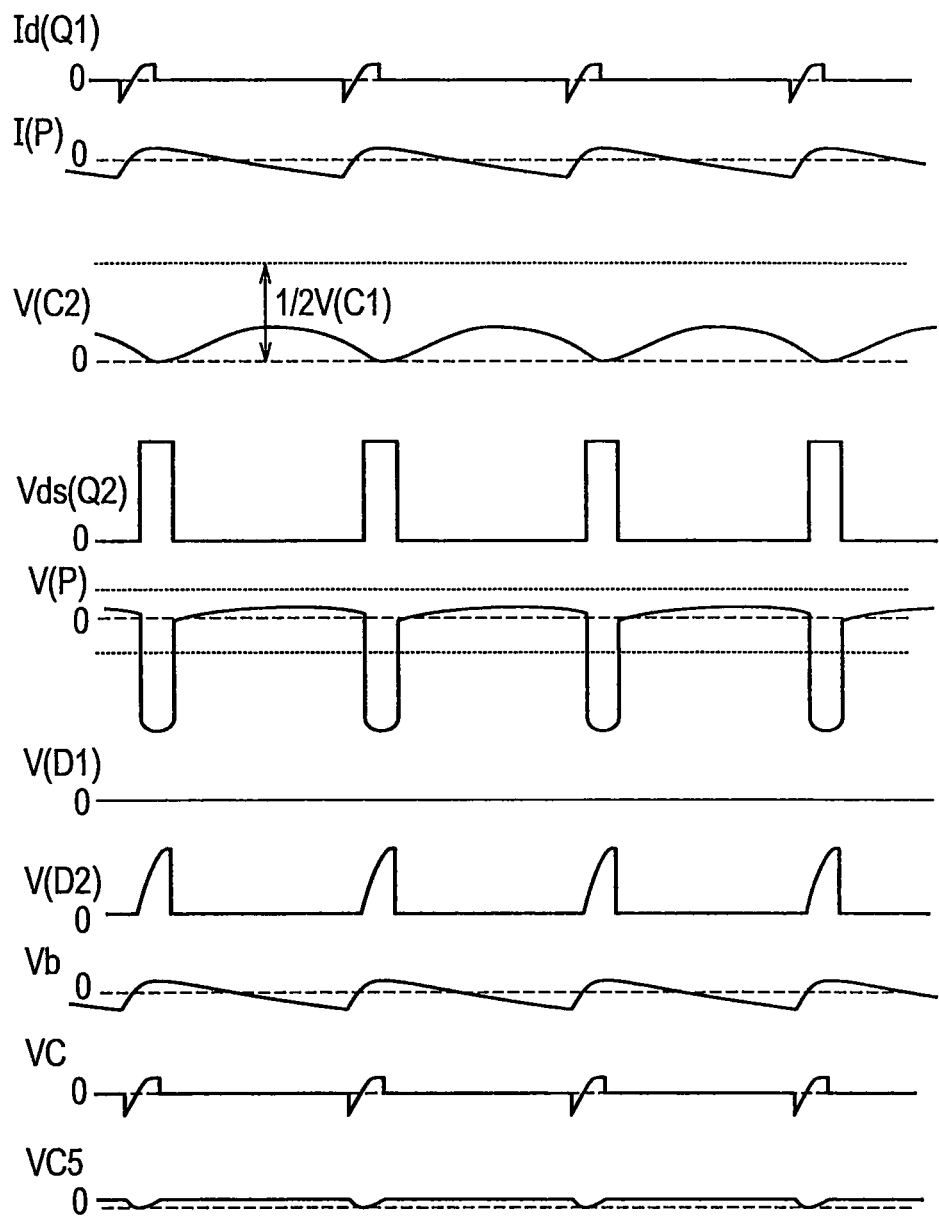
FIG. 11 is a chart illustrating waveforms of the portions of the current resonance type power supply device according to Embodiment 3 under light load.

Next, detailed description will be given with reference to FIGS. 7 to 11 with regard to operation of the current resonance type power supply device of Embodiment 3 thus configured. FIG. 8 illustrates relationships among the ON time of the low-side switch element, the ON time of the high-side switch element, the amount of feedback, the load condition, and the input voltage under light load, in the current resonance type power supply device of Embodiment 3. FIG. 8A illustrates a case where the input voltage is low; FIG. 8B, a case where the input voltage is middle; and FIG. 8C, a case where the input voltage is high. In FIG. 8, the amount of FB refers to the amount of feedback, and VR14 denotes the output voltage from the operational amplifier G11. FIG. 9 illustrates waveforms of portions under heavy load. FIG. 10 illustrates waveforms of the portions under middle load. FIG. 11 illustrates waveforms of the portions under light load.

Figure 2:
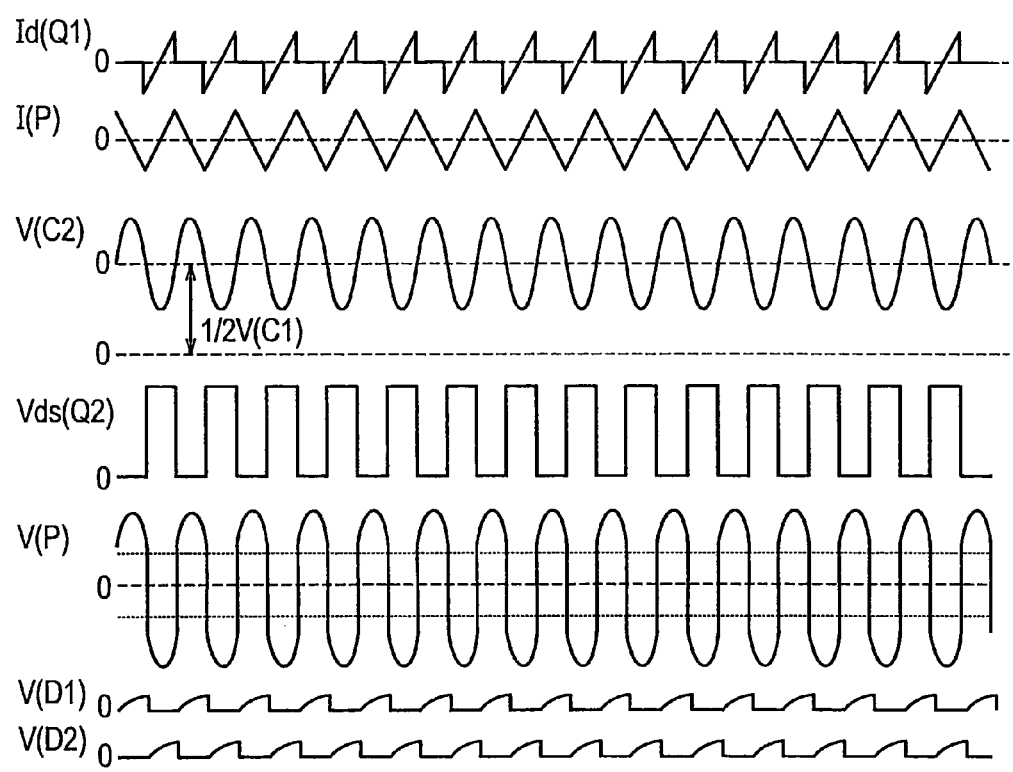
FIG. 2 is a chart illustrating waveforms of portions of the conventional current resonance type power supply device under light load.

In FIGS. 9 to 11, Vb represents a voltage of the resistor R4; Vc, a voltage of the resistor R3; and VC5, the voltage of the capacitor C5. Since description has been given with reference to FIGS. 1 and 2 with regard to basic current resonance operation of the current resonance type power supply device, description of the operation will be omitted, and description will be given here mainly with regard to operation of the third ON time controller.

Since ON/OFF operation of the switch element Q1 has been described in connection with the operation of the current resonance type power supply device of Embodiment 2, description of the ON/OFF operation will be omitted. The current of the constant current source I1 and the feedback current IFB from the detector 11 are inputted to the adder 16. The amount of feedback FB becomes larger under lighter load as illustrated in FIG. 8, and thus, the ON time Tho of the switch element Q1 becomes shorter under lighter load as illustrated in FIG. 8.

Next, ON/OFF operation of the switch element Q2 will be described. First, when the switch element Q1 is ON, a current flows through the primary winding P of the transformer T via the switch element Q1, and thus, the capacitor C4 detects the current flowing through the primary winding P of the transformer T and outputs the current to the resistor R4.

Also, when the switch element Q1 is ON, a non-inverting output terminal of the flip-flop circuit FF1 outputs a high level, and thus, the switch SW1 is turned on. Thus, a voltage generated in the resistor R4 is integrated by the integrating circuit of the resistor R3 and the capacitor C5, and the capacitor C5 obtains an average value of current across its ends. The average value of current is small under the light-load condition and is large under the heavy-load condition.

Further, the V/I 14 converts the voltage of the capacitor C5 into a current and inputs the converted current I14 to the adder 17. Thus, the adder 17 feeds a small current through the capacitor C8 under the light-load condition or feeds a large current through the capacitor C8 under the heavy-load condition. Thus, a charging voltage for the capacitor C8 gradually rises under the light-load condition. Thus, as illustrated in FIG. 8, the ON time of the switch element Q2 can be set long under the light-load condition. Also, under a heavy-load condition, the average value of current is large, and thus, the ON time Tlo of the switch element Q2 can be set short.

Therefore, under the light-load condition, as illustrated in FIG. 11, the voltage V(C2) of the current resonance capacitor C2 fluctuates about the voltage close to 0V. In other words, under the light-load condition, the ON/OFF time of the switch element Q1 and the switch element Q2 is set variable to change the duty ratio from 50% and thereby enable reducing the charging/discharging current and loss of the current resonance capacitor and hence improving the efficiency.

However, under the light-load condition, when the input voltage becomes large, the input voltage exceeds the constant voltage control range, and thus, it is necessary to return to control such that the duty ratio approaches 50%, and the input voltage from the smoothing capacitor C1 is detected by the resistor R10 and the resistor R11. The operational amplifier G11 provides a larger output voltage to the capacitor C5 as the value of the input voltage of the smoothing capacitor C1 detected by the resistor R10 and the resistor R11 becomes larger, and thus, the voltage of the capacitor C5 rises under the light-load condition.

Thus, under the light-load condition and when the input voltage is large, the ON time Tho of the switch element Q1 can become substantially the same as the ON time Tlo of the switch element Q2, as illustrated in FIG. 8C. In other words, the duty ratio between the switch element Q1 and the switch element Q2 can approach 50%, and thus, under the light-load condition, the constant voltage accuracy of the output voltage can be stabilized.

Embodiment 4

Figure 12:
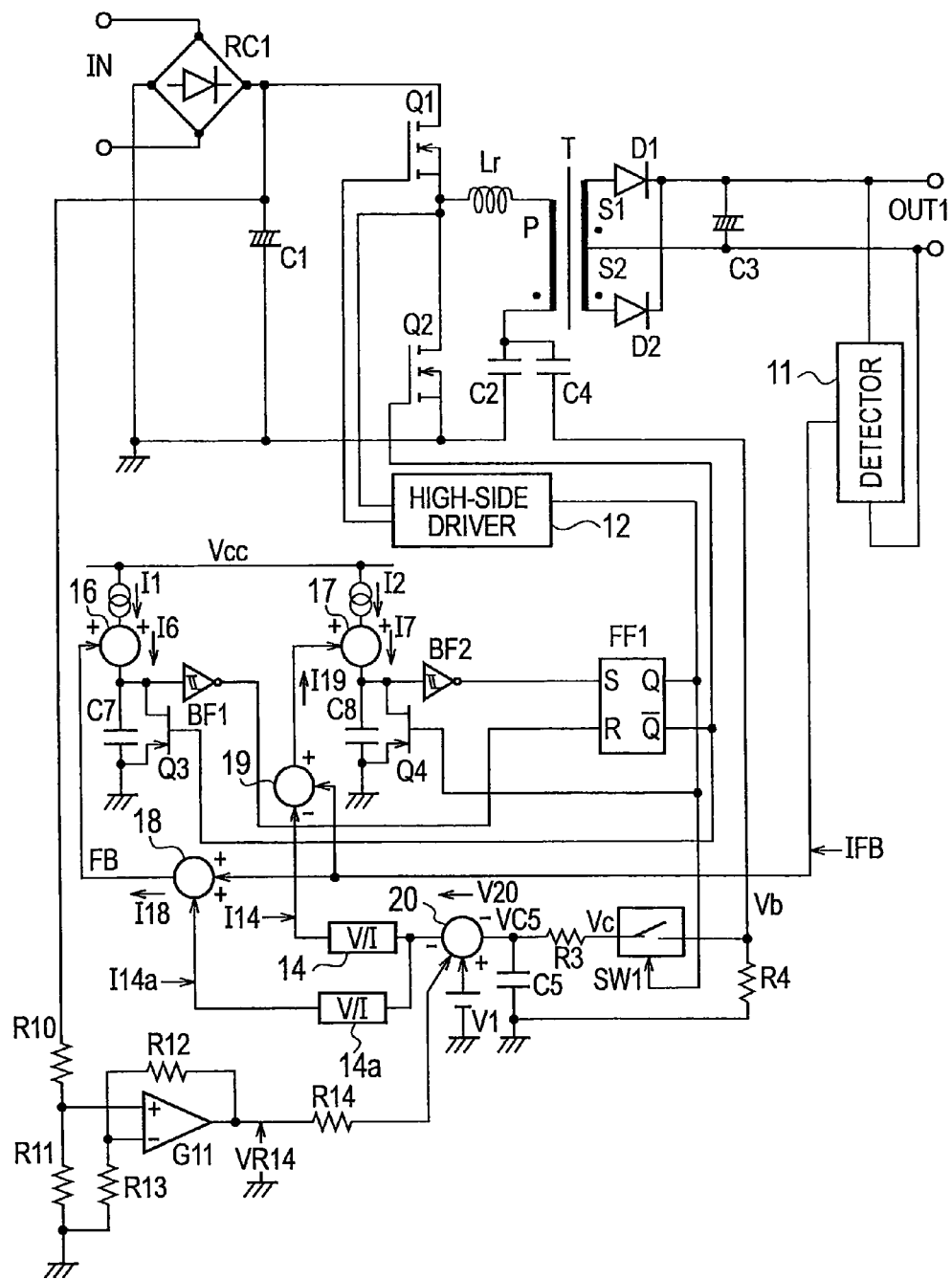
FIG. 12 is a circuit diagram of a current resonance type power supply device according to Embodiment 4.

FIG. 12 is a circuit diagram of a current resonance type power supply device according to Embodiment 4. The current resonance type power supply device according to Embodiment 4 illustrated in FIG. 12 is characterized by excluding the Zener diode ZD1 and further including a reference power supply V1, a V/I 14a, and adders 18, 19, 20, as compared to the configuration of the current resonance type power supply device of Embodiment 3 illustrated in FIG. 7.

The reference power supply V1, the voltage VC5 of the capacitor C5, the adder 20 and the V/Is 14, 14a form a load condition setting unit configured to set a load condition for switching the duty ratio between the first ON time Tho of the switch element Q1 and the second ON time Tlo of the switch element Q2 from 50% to anything other than 50%.

The above-described third ON time controller sets the second ON time Tlo of the switch element Q2 gradually longer than a predetermined time, as a load condition changes from a load condition set by the load condition setting unit to a light-load condition. The third ON time controller is characterized by including a fourth ON time controller configured to set the first ON time Tho of the switch element Q1 gradually shorter than a predetermined time, as the load condition changes from the load condition set by the load condition setting unit to the light-load condition.

The adder 20 subtracts the voltage VC5 of the capacitor C5 from a voltage of the reference power supply V1 and provides a subtracted output voltage to the V/Is 14, 14a. The V/Is 14, 14a convert the voltage into a current and output the current, when the voltage of the reference power supply V1 exceeds the voltage VC5 of the capacitor C5, or equivalently, when the subtracted output is a positive voltage.

The adder 19 subtracts the output current I14 from the V/I 14 from the FB current IFB from the detector 11 and outputs a subtracted current as a current I19 to the adder 17. The adder 17 adds the current I19 from the adder 19 and the current from the current source I2 together and charges the capacitor C8 with an added current I7.

The adder 18 adds a current I14a from the V/I 14a and the feedback current IFB together and outputs the added current as I18 to the adder 16. The adder 16 adds the current I18 from the adder 18 and the current of the current source I1 together and charges the capacitor C7 with the added current I6.

Figure 13A:
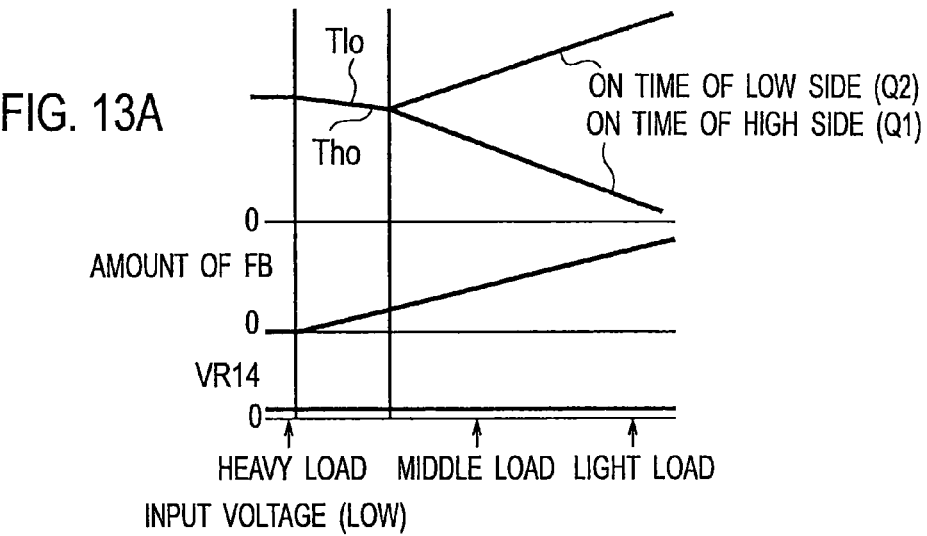
FIGS. 13A to 13C are graphs illustrating relationships among the ON time of the low-side switch element, the ON time of the high-side switch element, the amount of feedback, the load condition, and the input voltage under light load, in the current resonance type power supply device according to Embodiment 4.

Next, description will be given with reference to FIG. 13 with regard to operation of the current resonance type power supply device of Embodiment 4 thus configured.

Figure 13B:
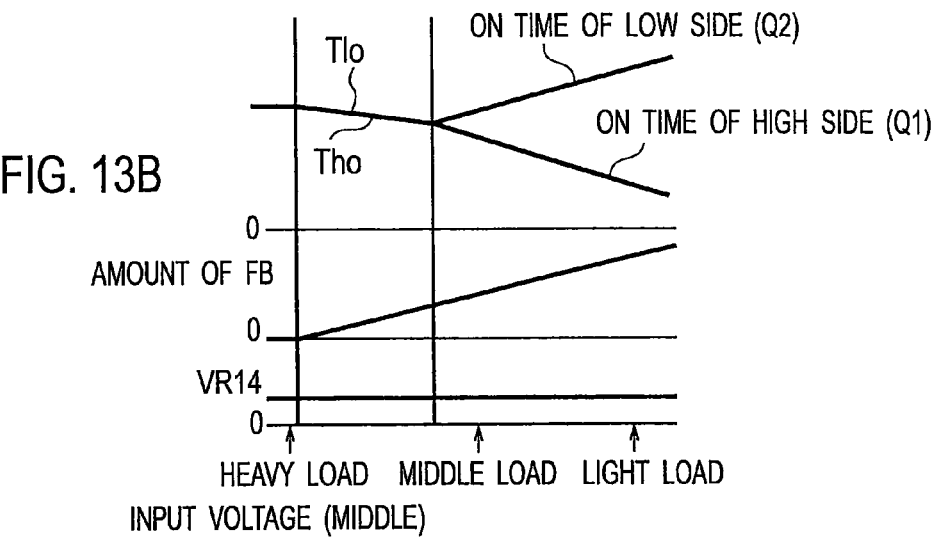

First, as illustrated in FIG. 13B, the voltage of the reference power supply V1 is set to a load condition of about middle load. When the voltage VC5 of the capacitor C5 is equal to or more than the voltage of the reference power supply V1, the V/Is 14, 14a do not operate. Thus, under a heavy-load through about middle-load condition, the V/Is 14, 14a do not output currents to the adders 18, 19. Therefore, the ON time Tho of the switch element Q1 and the ON time Tlo of the switch element Q2 are determined under control only based on the normal amount of FB. At this time, operation is performed at a duty ratio of 50%.

Meanwhile, as the load condition changes from an about middle-load condition to a light-load condition, the voltage VC5 decreases and thus a subtracted result of the voltage V20 becomes positive, and thus, the V/Is 14, 14a output the currents to the adders 18, 19, so that the currents from the V/Is 14, 14a are added to the normal amount of FB. Thus, the current I18 from the adder 18 and the current I1 flow through the capacitor C7, and the current I19 from the adder 19 and the current I2 flow through the capacitor C8. Thus, under an about middle-load through light-load condition, the ON time Tho of the switch element Q1 becomes shorter than the predetermined time, and the ON time Tlo of the switch element Q2 becomes longer than the predetermined time.

Thus, the reference power supply V1, the voltage VC5 of the capacitor C5 and the V/Is 14, 14a are used to set the load condition for switching the duty ratio between the first ON time Tho of the switch element Q1 and the second ON time Tlo of the switch element Q2 from 50% to anything other than 50%. In this example, as illustrated in FIG. 13B, the voltage of the reference power supply V1 is set to the load condition of about middle load, and, when the voltage of the reference power supply. V1 exceeds the voltage VC5 of the capacitor C5, the V/Is 14, 14a are operated to enable switching the duty ratio from 50% to anything other than 50%.

In other words, the load condition for switching the duty ratio from 50% to anything other than 50% can be set to any optimum one of heavy load, middle load and light load, and thus, the efficiency of the current resonance type power supply device can be improved.

Note that the setting of a load condition for switching the duty ratio from anything other than 50% to 50% is the same as the setting of the load condition for switching the duty ratio from 50% to anything other than 50%.

Also, under a light-load condition, when the input voltage becomes large, the input voltage exceeds the constant voltage control range, and thus, it is necessary that the duty ratio between the switch element Q1 and the switch element Q2 approach 50%. The operational amplifier G11 provides the larger output voltage VR14 to the adder 20 as the value of the input voltage of the smoothing capacitor C1 detected by the resistor R10 and the resistor R11 becomes larger, and thus, the adder 20 provides a smaller output voltage.

In other words, when a total voltage obtained by subtracting the voltage from the resistor R14 from the voltage of the reference power supply V1 exceeds the voltage VC5 of the capacitor C5, the V/Is 14, 14a are operated to enable switching the duty ratio from 50% to anything other than 50%. When the input voltage is large, the output voltage from the adder 20 is a small voltage, and thus, the V/I 14 and the V/I 14a do not operate, so that the duty ratio is set to 50%.

Figure 13C:
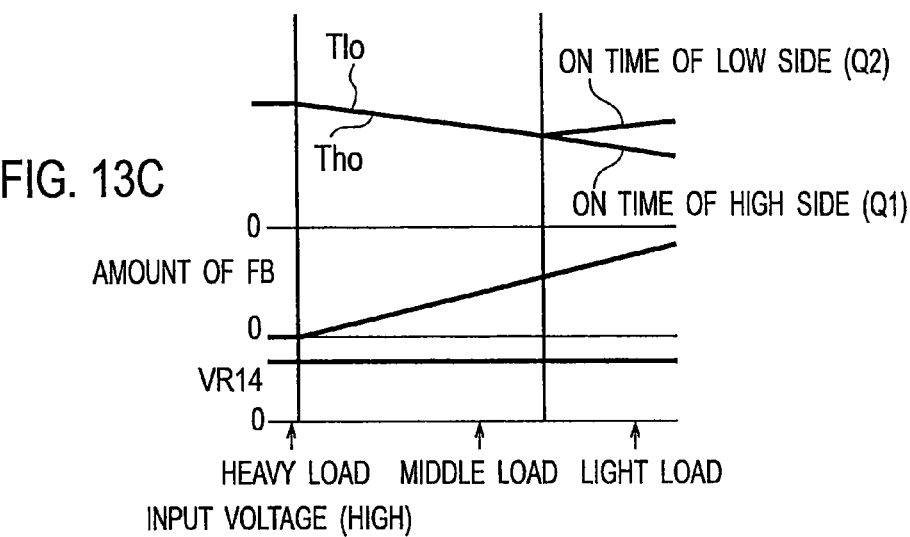

Thus, as illustrated in FIG. 13C, under the light-load condition and when the input voltage is large, the ON time Tho of the switch element Q1 and the ON time Tlo of the switch element Q2 can be set to substantially the same time under a heavy-load, middle-load or light-load condition. In other words, the duty ratio between the switch element Q1 and the switch element Q2 can approach 50%, and thus, under the light-load condition, the constant voltage accuracy can be stabilized.

Therefore, the current resonance type power supply device of Embodiment 4 also enables optimum setting and hence more effective adjustment, as compared to the effect of the current resonance type power supply device of Embodiment 2.

Embodiment 5

Figure 14:
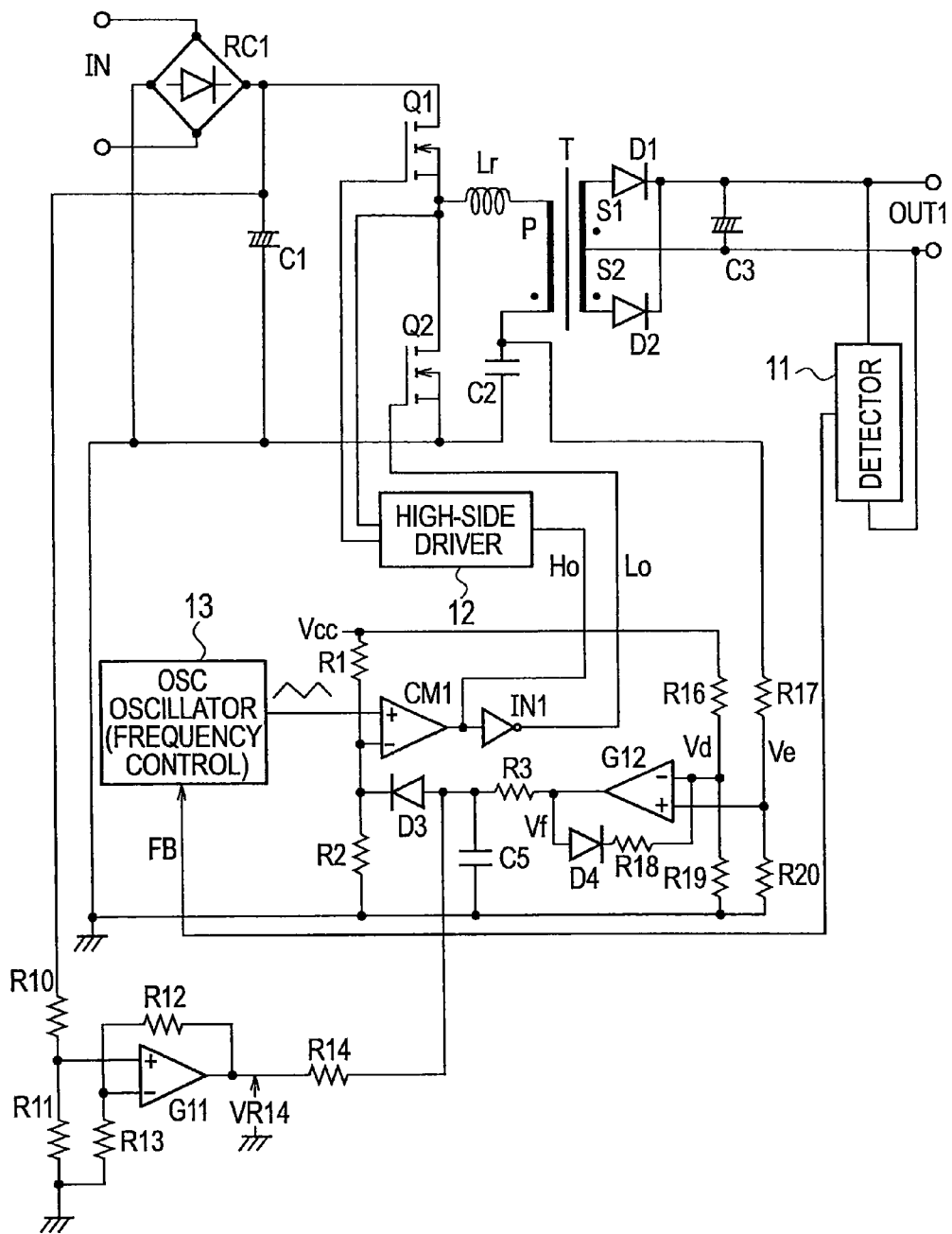
FIG. 14 is a circuit diagram of a current resonance type power supply device according to Embodiment 5.

FIG. 14 is a circuit diagram of a current resonance type power supply device according to Embodiment 5. The current resonance type power supply device of Embodiment 5 illustrated in FIG. 14 is characterized by further including a fifth ON time controller including resistors R16 to R20, a diode D4, and an operational amplifier G12, in addition to the configuration of the current resonance type power supply device of Embodiment 1 illustrated in FIG. 3.

The fifth ON time controller sets one of the first ON time Tho of the switch element Q1 and the second ON time Tlo of the switch element Q2, shorter than a predetermined time, and sets the other of the first ON time Tho and the second ON time Tlo longer than the predetermined time, under a light-load condition, based on a value of voltage detected by the capacitor C2.

One end of the resistor R17 is connected to one end of the capacitor C2 and one end of the primary winding P, and one end of the resistor R20 and a non-inverting input terminal of the operational amplifier G12 are connected to the other end of the resistor R17. One end of the resistor R16 and one end of the resistor R19 are connected to an inverting input terminal of the operational amplifier G12, the other end of the resistor R16 is connected to the power supply Vcc, and the other end of the resistor R19 is grounded.

A series circuit of the resistor R18 and the diode D4 is connected across the inverting input terminal and an output terminal of the operational amplifier G12. One end of the resistor R3 and an anode of the diode D4 are connected to the output terminal of the operational amplifier G12. One end of the capacitor C5 and the anode of the diode D3 are connected to the other end of the resistor R3. The cathode of the diode D3 is connected to one end of the resistor R1 and one end of the resistor R2, and the other end of the capacitor C5 is grounded.

Next, detailed description will be given with reference to FIGS. 14 to 16 with regard to operation of the current resonance type power supply device of Embodiment 5 thus configured.

First, when the switch element Q1 is ON, a current flows through the primary winding P of the transformer T via the switch element Q1, and thus, the capacitor C2 is charged, and a voltage Ve is generated in the resistor R20 through the resistor R17. The operational amplifier G12 compares a divided voltage Vd obtained by dividing the voltage of the power supply Vcc by the resistor R16 and the resistor R19, with a voltage across ends of the resistor R20.

Figure 15A:
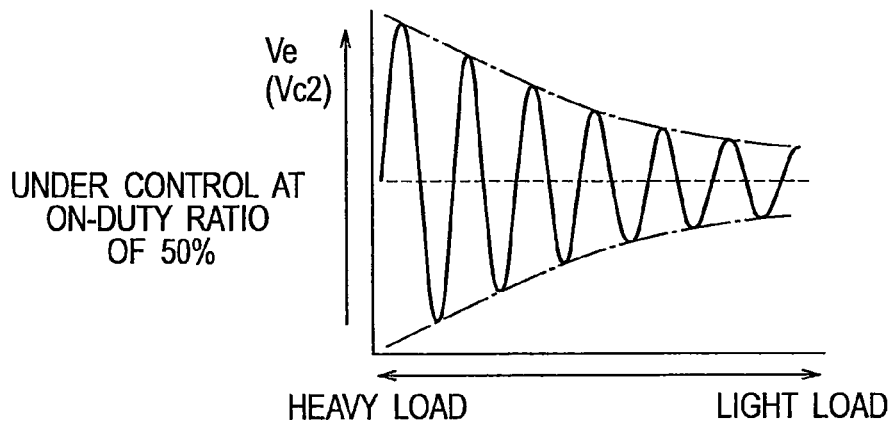
FIGS. 15A to 15C are graphs illustrating a Ve waveform when the load condition is changed from heavy load to light load under control at an on-duty ratio of 50% in the conventional current resonance power supply, and a Ve waveform when the load condition is changed from heavy load to light load under control in Embodiment 5.
Figure 15B:
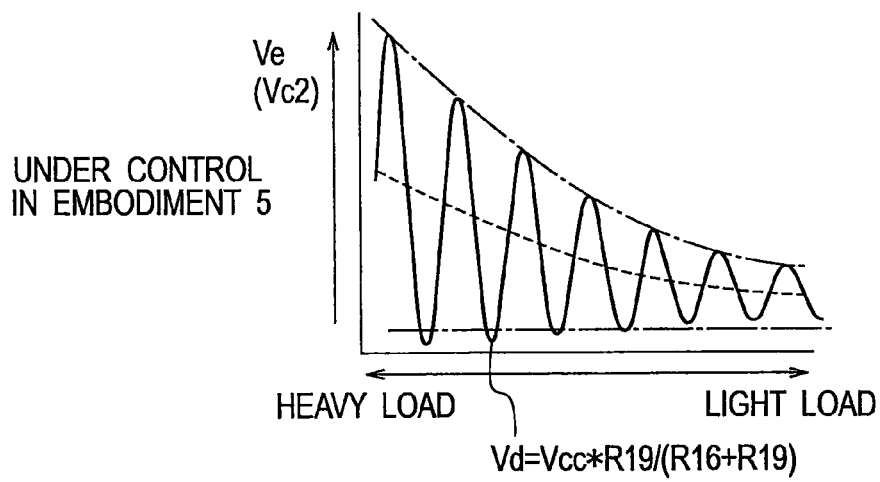

FIG. 15A illustrates a Ve waveform when the load condition is changed from heavy load to light load under control at an on-duty ratio of 50% in the conventional current resonance power supply, and FIG. 15B illustrates a Ve waveform when the load condition is changed from heavy load to light load under control in Embodiment 5.

Figure 16A:
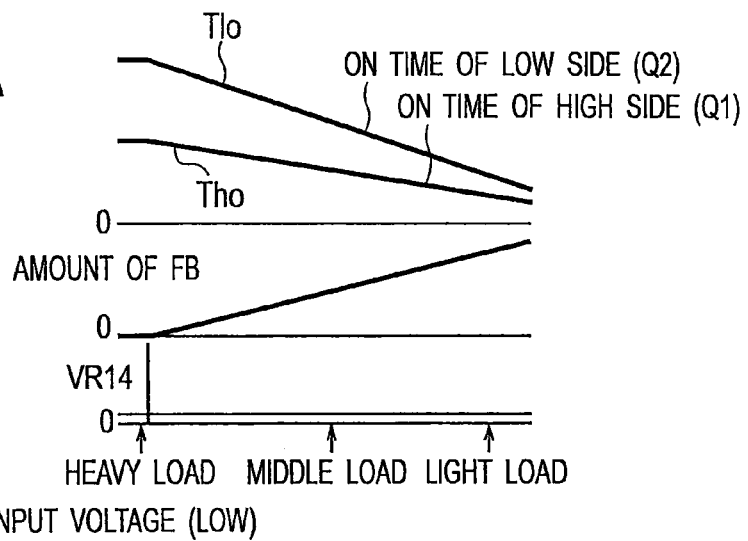
FIGS. 16A to 16C are graphs illustrating relationships among the ON time of the low-side switch element, the ON time of the high-side switch element, the amount of feedback, the load condition, and the input voltage under light load, in the current resonance type power supply device according to Embodiment 5.
Figure 16B:
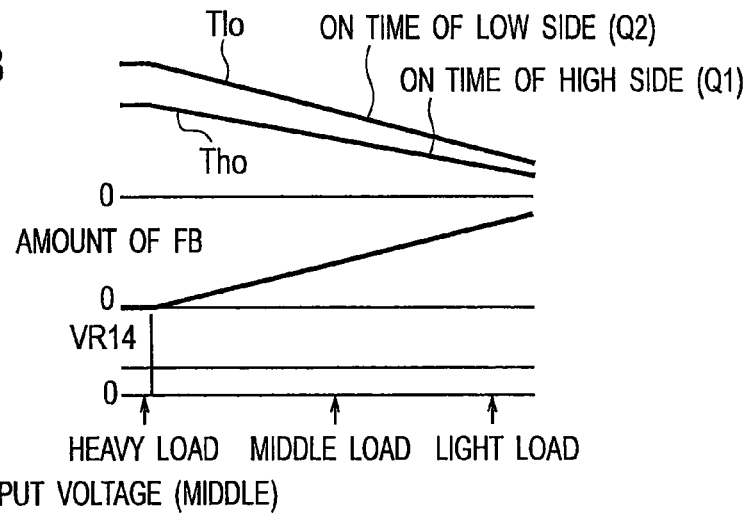
Figure 16C:
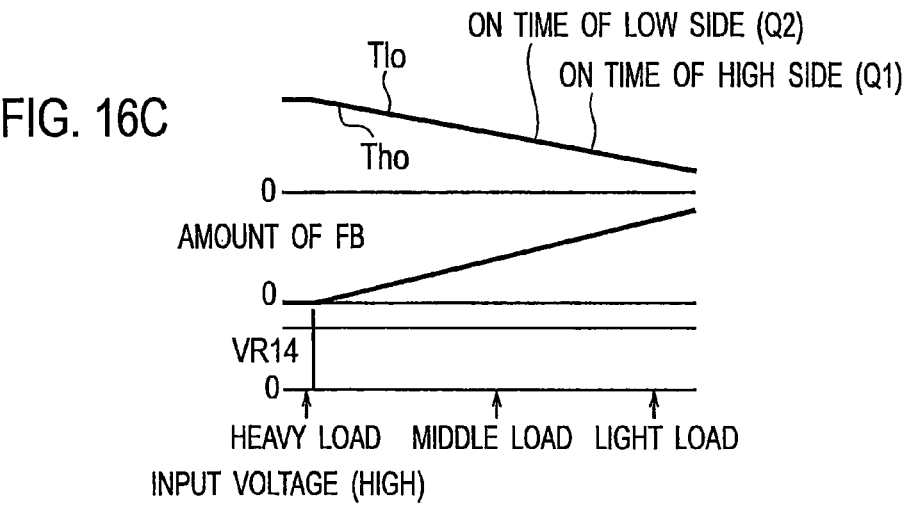

FIG. 16 illustrates relationships among the ON time of the low-side switch element, the ON time of the high-side switch element, the amount of feedback, the load condition, and the input voltage under light load, in the current resonance type power supply device of Embodiment 5. FIG. 16A illustrates a case where the input voltage is low; FIG. 16B, a case where the input voltage is middle; and FIG. 16C, a case where the input voltage is high. Firstly, description will be given with regard to operation in the case where the input voltage is low as illustrated in FIG. 16A and in the case where the input voltage is middle as illustrated in FIG. 16B.

Here, the resistor R18 is connected from the output of the operational amplifier G12 via the diode D4 to the inverting terminal, and thus, as illustrated in FIG. 16C, when the non-inverting terminal voltage Ve exceeds an initialized voltage, an output voltage from the operational amplifier G12 is added to the inverting terminal via the resistor R18, and gain is determined by constants of the resistor R18, the resistor R16 and the resistor R19. This corresponds to Vf characteristics from a Vd line toward lighter load in FIG. 15C. The voltage Vd is represented as: Vd=Vcc×R19/(R16+R19), where Vcc denotes the power supply voltage.

Here, when the non-inverting terminal voltage Ve is smaller than the initialized voltage, the diode D4 is reverse-biased and turned off, and thus, the operational amplifier G12 operates to show an open loop gain and in turn output zero volt. At this time, an electric charge of the capacitor C5 is discharged via the resistor R3.

Figure 15C:
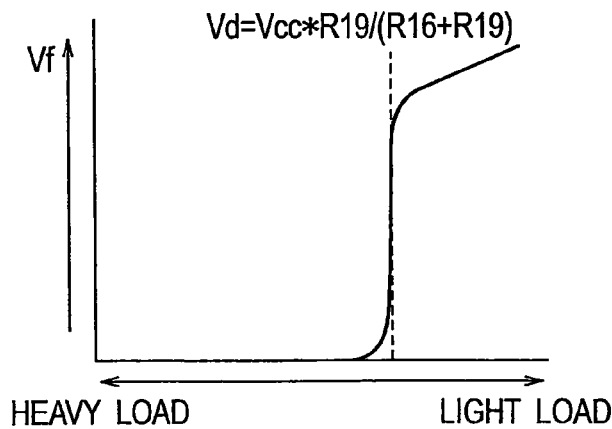

Under a heavy-load condition the amount of discharging is larger than the amount of charging from the operational amplifier G12, and Vf characteristics from the Vd line toward heavier load in FIG. 15C become zero volt. Also, under a light-load condition, as illustrated in FIG. 15B, a bottom voltage of the waveform generated in the resistor R20 becomes higher than the voltage Vd of the resistor R19 and enters a state in which the capacitor C5 is charged, thus increasing an inverting terminal voltage of the comparator CM1 via the diode D3.

Under the light-load condition, the bottom voltage of the waveform generated in the resistor R20 is higher than the bottom voltage of the waveform under the heavy-load condition, and thus, the output from the operational amplifier G12 under the light-load condition is larger than the output under the heavy-load condition. Thus, under the light-load condition, the voltage of the capacitor C5 also becomes large, thus increasing the reference voltage at the junction of the resistor R1 and the resistor R2 via the diode D3.

When the triangle wave signal from the oscillator 13 is equal to or more than the reference voltage, the comparator CM1 outputs a high level to the switch element Q1. Under the light-load condition, the reference voltage becomes higher than that under the heavy-load condition, and thus, a high level time becomes short, so that the ON time Tho of the switch element Q1 becomes short.

Meanwhile, the inverter IN1 inverts the output from the comparator CM1, and thus, when the triangle wave signal from the oscillator 13 is less than the reference voltage, the inverter IN1 outputs a high level to the switch element Q2. In other words, under the light-load condition, the reference voltage becomes higher than that under the heavy-load condition, and thus, the ON time Tlo of the switch element Q2 becomes long.

Next, description will be given with regard to the case where the input voltage is high as illustrated in FIG. 16C. Under the light-load condition, when the input voltage becomes large, the input voltage exceeds the constant voltage control range, and thus, it is necessary to return to control such that the duty ratio approaches 50%, and the input voltage from the smoothing capacitor C1 is detected by the resistor R10 and the resistor R11. Under the light-load condition, the operational amplifier G11 provides a larger output voltage to the capacitor C5 as the value of the input voltage of the smoothing capacitor C1 detected by the resistor R10 and the resistor R11 becomes larger, and thus, the voltage of the capacitor C5 rises.

Thus, even under the light-load condition, the ON time Tho of the switch element Q1 can become the same as the ON time Tlo of the switch element Q2, as illustrated in FIG. 16C. In other words, the duty ratio between the switch element Q1 and the switch element Q2 can approach 50%, and thus, the constant voltage accuracy of the output voltage can be stabilized under the light-load condition.

Therefore, the current resonance type power supply device of Embodiment 5 can also achieve the same effect as that of the current resonance type power supply device of Embodiment 1. FIG. 17 illustrates waveforms of the portions under light load.

Note that the invention is not limited to the current resonance type power supply devices of Embodiments 1 to 5. In the current resonance type power supply device of Embodiment 5, a power supply of the resistor R16 is supplied by the power supply Vcc; however, for example, one end of the resistor R16 may be connected to one end of the smoothing capacitor C1 and the output end of the full-wave rectifier circuit RC1 so that the smoothing capacitor C1 supplies the power supply to the resistor R16. Even with such a configuration, the same effect as that of Embodiment 5 can be achieved.

Also, a combination of two or more embodiments of the current resonance type power supply devices of Embodiments 1 to 5 may be configured. Such a configuration can achieve the effects of plural embodiments.

According to embodiments, such as Embodiments 1-5 described above, when the voltage detector detects the voltage of the DC power supply, the duty controller, under the light-load condition, sets the duty ratio between the first switch element and the second switch element closer to 50% as the value of the voltage detected by the voltage detector becomes larger, and thus, even under the light-load condition, the output voltage can be controlled with stability.

What is claimed is:

1. A current resonance type power supply device, comprising:
   a first switch element and a second switch element connected in series across ends of a DC (direct current) power supply;
   a series circuit connected to a junction of the first switch element and the second switch element and to one end of the DC power supply, and having a series connection of a primary winding of a transformer and a capacitor;
   a rectifier/smoothing circuit configured to rectify and smooth a voltage generated in a secondary winding of the transformer thereby to extract a DC voltage;
   a control circuit configured to alternately turn on and off the first switch element and the second switch element;
   a voltage detector configured to detect a voltage of the DC power supply;
   a duty controller configured to, under a light-load condition, set a duty ratio between the first switch element and the second switch element closer to 50% as a value of the voltage detected by the voltage detector becomes larger;
   a current detector configured to detect a current flowing through the primary winding of the transformer; and
   a first ON time controller configured to set one of a first ON time of the first switch element and a second ON time of the second switch element, shorter than a predetermined time in which the duty ratio is 50%, and to set the other of the first ON time and the second ON time longer than the predetermined time, under the light-load condition based on a value of the current detected by the current detector.

2. A current resonance type power supply device, comprising:
   a first switch element and a second switch element connected in series across ends of a DC (direct current) power supply;
   a series circuit connected to a junction of the first switch element and the second switch element and to one end of the DC power supply, and having a series connection of a primary winding of a transformer and a capacitor;

a rectifier/smoothing circuit configured to rectify and smooth a voltage generated in a secondary winding of the transformer thereby to extract a DC voltage;

a control circuit configured to alternately turn on and off the first switch element and the second switch element;

a voltage detector configured to detect a voltage of the DC power supply;

a duty controller configured to, under a light-load condition, set a duty ratio between the first switch element and the second switch element closer to 50% as a value of the voltage detected by the voltage detector becomes larger;

a detector configured to detect the DC voltage from the rectifier/smoothing circuit; and a second ON time controller configured to set the one of the first ON time of the first switch element and the second ON time of the second switch element, shorter than the predetermined time in which the duty ratio is 50%, under the light-load condition based on the DC voltage detected by the detector.

3. The current resonance type power supply device according to claim 2, further comprising:

a current detector configured to detect a current flowing through the primary winding of the transformer; and a third ON time controller configured to set the other of the first ON time of the first switch element and the second ON time of the second switch element, longer than the predetermined time, under the light-load condition based on a value of the current detected by the current detector.

4. The current resonance type power supply device according to claim 3, further comprising:

a load condition setting unit configured to set a load condition for switching the duty ratio between the first ON time of the first switch element and the second ON time of the second switch element from 50% to any ratio other than 50%; and a fourth ON time controller configured to set the other of the first ON time and the second ON time, gradually shorter than the predetermined time, as the load condition becomes lighter from the load condition set by the load condition setting unit.

5. A current resonance type power supply device, comprising:

a first switch element and a second switch element connected in series across ends of a DC (direct current) power supply;

a series circuit connected to a junction of the first switch element and the second switch element and to one end of the DC power supply, and having a series connection of a primary winding of a transformer and a capacitor;

a rectifier/smoothing circuit configured to rectify and smooth a voltage generated in a secondary winding of the transformer thereby to extract a DC voltage;

a control circuit configured to alternately turn on and off the first switch element and the second switch element;

a voltage detector configured to detect a voltage of the DC power supply;

a duty controller configured to, under a light-load condition, set a duty ratio between the first switch element and the second switch element closer to 50% as a value of the voltage detected by the voltage detector becomes larger;

a second voltage detector configured to detect a voltage of the capacitor; and a fifth ON time controller configured to set the one of the first ON time and the second ON time shorter than the predetermined time and set the other of the first ON time and the second ON time longer than the predetermined time, under the light-load condition based on a value of the voltage detected by the second voltage detector.

* * * * *